United States Patent
Zhang et al.

(10) Patent No.: US 6,181,711 B1
(45) Date of Patent: Jan. 30, 2001

(54) SYSTEM AND METHOD FOR TRANSPORTING A COMPRESSED VIDEO AND DATA BIT STREAM OVER A COMMUNICATION CHANNEL

(75) Inventors: Ji Zhang, San Jose; Wen H. Chen, Sunnyvale; Fang Wu, San Jose, all of CA (US)

(73) Assignee: Cisco Systems, Inc., San Jose, CA (US)

( * ) Notice: Under 35 U.S.C. 154(b), the term of this patent shall be extended for 0 days.

(21) Appl. No.: 08/947,480

(22) Filed: Oct. 10, 1997

Related U.S. Application Data

(60) Provisional application No. 60/051,109, filed on Jun. 26, 1997.

(51) Int. Cl.[7] ........................................... H04J 3/16
(52) U.S. Cl. ............................................. 370/468; 370/538
(58) Field of Search ........................... 370/465, 468, 370/545, 522, 537, 538, 203, 210, 484

(56) References Cited

U.S. PATENT DOCUMENTS

| | | | |
|---|---|---|---|
| 5,493,456 | 2/1996 | Augenbraum et al. | 360/64 |
| 5,570,197 | 10/1996 | Boon | 386/46 |
| 5,751,701 | * 5/1998 | Langberg et al. | 370/281 |
| 5,754,235 | * 5/1998 | Urano et al. | 348/405 |
| 5,812,786 | * 9/1998 | Seazholtz et al. | 709/233 |
| 6,026,097 | * 2/2000 | Voois et al. | 370/468 |

OTHER PUBLICATIONS

Information Technology—Generic Coding of Moving Pictures and Associated Audio, ISO/IEC 1–13818–1, Nov. 13, 1994.

"Network and Customer Installation Interfaces—Asymmetric Digital Subscriber Line (ADSL) Metallic Interface," American National Standards Institute, ANSI T1. 413–1995.

The ATM Forum Technical Committee User–Network Interface Specification, Version 3.1 (UNI 3.1), Aug. 18, 1995.

* cited by examiner

Primary Examiner—Joseph L. Felber
(74) Attorney, Agent, or Firm—Beyer Weaver & Thomas, LLP

(57) ABSTRACT

Digitally compressed video/audio bit streams, when transmitted over digital communication channels such as digital subscriber loop (DSL) access networks, ATM networks, satellite, or wireless digital transmission facilities, can be corrupted due to lack of sufficient channel bandwidth. This invention describes schemes to ensure lossless transmission of bit streams containing pre-compressed video signals within the communication channels. The schemes herein comprises a rate conversion system that converts the bit rate of a pre-compressed video bit stream from one bit rate to another, and that is integrated with a digital communication channel, and a means to convey the maximum channel transmission rate to the rate conversion system to allow satisfactory transmission of the bit stream from the input of the rate converter through the transmission facility.

37 Claims, 16 Drawing Sheets

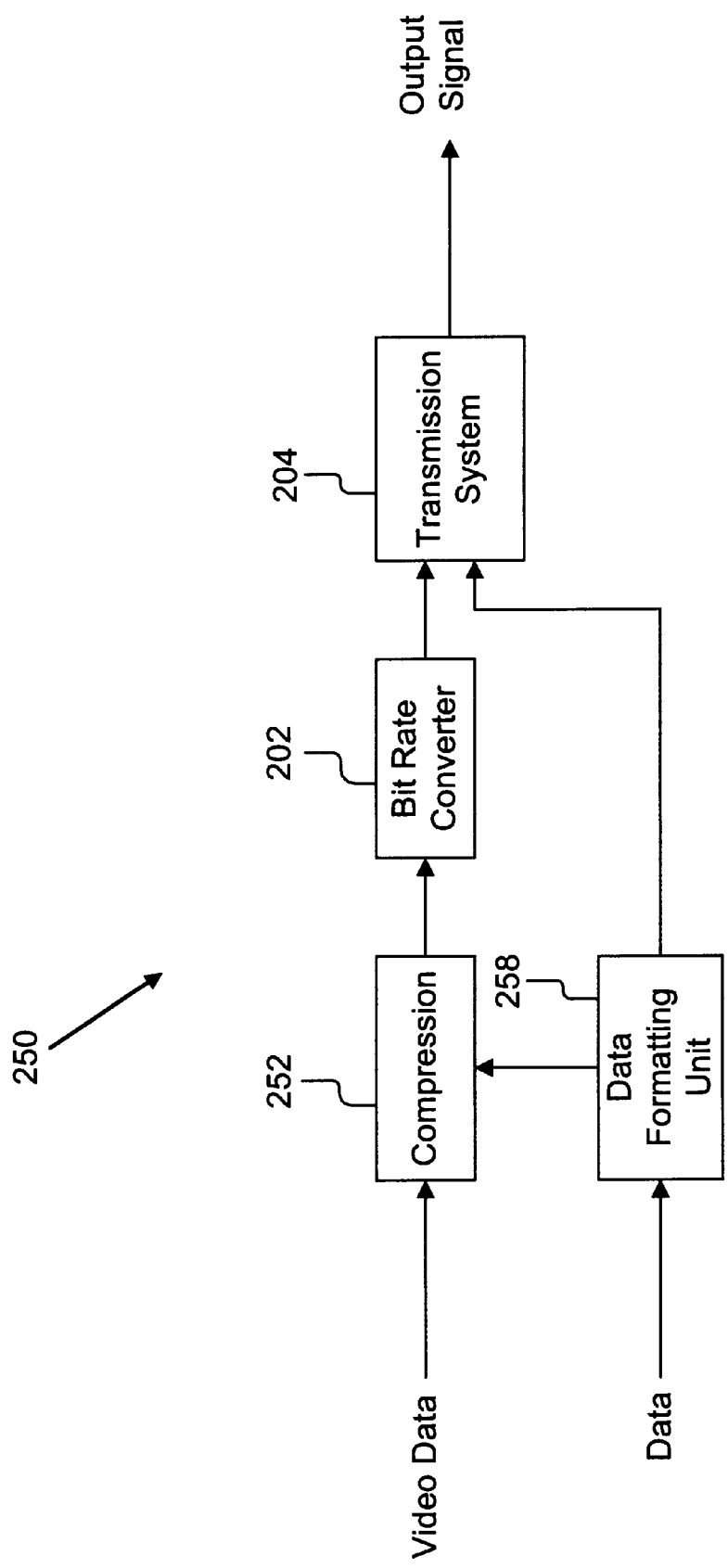

SYSTEM AND METHOD FOR TRANSPORTING A COMPRESSED VIDEO AND DATA BIT STREAM OVER A COMMUNICATION CHANNEL

This application claims benefit of provisional application Ser. No. 06/051,109, filed Jun. 26, 1997.

BACKGROUND OF THE INVENTION

1. Field of the Invention

The present invention relates generally to communication channels and systems for transmitting data. In particular, the present invention relates to a system and method for transmitting compressed digital video signals over a communication channel. Still more particularly, the present invention relates to a system and method for transmitting compressed digital video signals over digital subscriber loop (DSL) access networks and asynchronous transfer mode (ATM) networks.

2. Description of the Background Art

There are presently a variety of different communication channels for transmitting or transporting video data. For example, communication channels such as digital subscriber loop (DSL) access networks, ATM networks, satellite, or wireless digital transmission facilities are all well known. In fact, many standards have been developed for transmitting data on the communication channels. The present invention relates to such communication channels, and for the purposes of the present application a channel is defined broadly as a connection facility to convey properly formatted digital information from one point to another. A channel includes some or all of the following elements: 1) physical devices that generate and receive the signals (modulator/demodulator); 2) physical medium that carries the actual signals; 3) mathematical schemes used to encode and decode the signals; 4) proper communication protocols used to establish, maintain and manage the connection created by the channel. The concept of a channel includes but is not limited to a physical channel, but also logical connections established on top of different network protocols, such as xDSL, ATM, TCP/IP, wireless, HFC, coaxial cable, etc.

The channel is used to transport a bit stream, or a continuous sequence of binary bits used to digitally represent compressed video, audio or data. The bit rate is the number of bits per second that the channel is able to transport. The bit error rate is the statistical ratio between the number of bits in error due to transmission and the total number of bits transmitted. The channel capacity is the maximum bit rate at which a given channel can convey digital information with a bit error rate no more than a given value. And finally, a multiplex is a scheme used to combine bit stream representations of different signals, such as audio, video, or data, into a single bit stream representation.

One problem with existing communication channels is their ability to handle the transportation of video data. Video data is much larger than many other types of data, and therefore, requires much more bandwidth from the communication channels. Since transmission of video data with existing communication channels would require excessive amounts of time, compression is an approach that has been used to make digital video images more transportable.

Digital video compression schemes allow digitized video frames to be represented digitally in much more efficient manner. Compression of digital video makes it practical to transmit the compressed signal by digital channels at a fraction of the bandwidth required to transmit the original signal without compression. International standards have been created on video compression schemes. These include MPEG-1, MPEG-2, H.261, H.262, H.263, etc. These standardized compression schemes mostly rely on several key algorithm schemes: motion compensated transform coding (for example, DCT transforms or wavelet/sub-band transforms), quantization of the transform coefficients, and variable length encoding (VLC). The motion compensated encoding removes the temporally redundant information inherent in video sequences. The transform coding enables orthogonal spatial frequency representation of spatial domain video signals. Quantization of the transformed coefficients reduces the number of levels required to represent a given digitized video sample and is the major factor in bit usage reduction in the compression process. The other factor contributing to the compression is the use of variable length coding (VLC) so that most frequently used symbols are represented by the shortest code word. In general, the number of bits used to represent a given image determines the quality of the decoded picture. The more bits used to represent a given image, the better the image quality. The system that is used to compress digitized video sequence using the above described schemes is called an encoder or encoding system.

In the prior art compression schemes, the quantization scheme is lossy, or irreversible process. Specifically, it results in loss of video textural information that cannot be recovered by further processing at a later stage. In addition, the quantization process has direct effect on the resulting bit usage and decoded video quality of the compressed bit stream. The schemes at which the quantization parameters are adjusted control the resulting bit rate of the compressed bit stream. The resulting bit stream can have either constant bit rate, CBR, or variable bit rate, VBR. CBR compressed bit stream can be transmitted over channel delivers digital information at a constant bit rate.

A compressed video bit stream generally is intended for real-time decoded playback at a different time or location. The decoded real-time playback must be done at 30 frames per second for NTSC standard video and 25 frames per second for PAL standard video. This implies that all of the information required to represent a digital picture must be delivered to the destination in time for decoding and display in timely manner. Therefore, this requires that the channel must be capable of making such delivery. From a different perspective, the transmission channel imposes bit rate constraint on the compressed bit stream. In general, the quantization in the encoding process is adjusted so that the resulting bit rate can be accepted by the transmission channel.

Because both temporal and spatial redundancies are removed by the compression schemes and because of variable length encoding, the resulting bit stream is much more sensitive to bit errors or bit losses in the transmission process than if the uncompressed video is transmitted. In other words, minor bit error or loss of data in compressed bit stream typically results in major loss of video quality or even complete shutdown of operation of the digital receiver/decoder.

Further, a real-time multimedia bit stream is highly sensitive to delays. A compressed video bit stream, when transmitted under excessive and jittery delays, will cause the real-time decoder buffer to under flow or overflow, causing the decoded video sequence to be jerky, or causing the audio video signals out of synchronization. Another consequence of the real-time nature of compressed video decoding is that lost compressed data will not be re-transmitted.

One particular communication channel that is becoming increasingly common is Asynchronous Transfer Mode (ATM) networks. ATM networks are based on the ATM transport protocol which can be used to transport data or multimedia bit stream with pre-specified quality of service. Unlike the xDSL standard, ATM protocols specifies how data is first packetized into fixed sized data units, called cells. It also specifies how such a cell stream can be multiplexed, de-multiplexed, switched and routed between different locations to support end-to-end connections at given bit rate and/or quality of service (QOS). In ATM networks, data bit stream to be transported are first converted into fixed sized ATM cells, each cell has a 5 byte header and up to 48 bytes of payload. Of particular interests to our invention is the capability of ATM networks to carry MPEG transport streams.

In ATM networks, connections can be established with pre-determined grade of QOS. Conditions of network utilization, along with call admission control sometimes may prevent a new connection from being established at the given bit rate or given quality of service. In such cases, the requested connection may either have to be rejected or a new set of admissible connection parameters have to be negotiated between the network service provider and the user requesting the connection.

ATM networks can be used to carry either constant bit rate (CBR) or variable bit rate (VBR) bit stream. The bit stream may be compressed bit stream or data. In either case, an agreement must be made between the user requesting the connection and the network service provider. The connection agreement includes the bit rate profile of the bit stream and quality of service. If such an agreement cannot be reached, either the connection must be rejected, or the bit rate profile must be modified, or the mismatched bit rates may cause periodic loss of data within the ATM networks, which results in corrupted bit stream in the receiver/decoder. Specific decoded video quality depends on the decoder design.

The process of modifying the bit rate profile of the input bit stream is called traffic shaping. The objective of the traffic shaping is to smooth out the burstiness of the ATM cell stream so that the resulting bit rate profile is more constant than that without traffic shaping. Existing methods to do traffic shaping include using a large buffer to smooth out the bit rate fluctuation, or to selectively drop ATM cells during high bit rate period. These methods were originally designed for connections carrying data streams or non-real-time multimedia bit stream. In the case of using large buffers, data bit stream is not sensitive to large delay variations. In the case of selective cell dropping, higher layer communication protocols will retransmit the lost information at a later time. However, in the case of transporting real-time compressed video, none of the method is acceptable because of the tight constraint on the end-to-end delay variation. For example, when ATM networks are used to transport MPEG-2 transport stream, the end-to-end jitter typically shall not be more than 1 millisecond. The use of rate converter as traffic shaper will solve exactly this problem.

Within ATM networks data loss may also occur when there is not enough channel bandwidth to send all of the ATM cells. In this case, ATM cells may be dropped from the overflowing buffers. If the bit stream carried in the connection complies with the connection agreement, such event will occur very infrequently and falls within the bounds of the quality of service constraints.

Also, it is important to point out that in general compressed video bit streams are generated by either real-time encoders or pre-compressed video server storage systems, which are likely to be in a remote site, away from the network facility itself. This implies that in general it is difficult to encode the video signal with a resulting bit rate profile tailored to the connection bandwidth available from the ATM network.

ATM network protocols are under intense international standardization effort and several industry wide interoperable specifications have been produced, including the one specific on means to carry MPEG-2 transport streams over ATM networks using ATM Adaptation Layer 5 (AAL-5).

Therefore, there is a need for a system and method for transmitting digital video information over data channels, that is simple to implement and has smaller delay, and can match the input bit rate to the channel bandwidth, resulting in a dramatically reduced bit error rate.

SUMMARY OF THE INVENTION

The present invention overcomes the deficiencies and limitations of the prior art with a system and method for converting a bit stream of a given bit rate to a different bit rate for reliable transport over communication channels. In various embodiments, the present invention includes: transmission of a compressed bit stream over Asymmetric Digital Subscriber Lines (ADSL) with rate adaptive capabilities (RADSL); transmission of a compressed bit stream over Asynchronous Transfer Mode (ATM) networks; flexible sharing of bandwidth of common communication channels among compressed bit stream and data traffic (including, but not limited to, data stream based on the ATM protocols or TCP/IP protocols, etc.); and statistical multiplexing of MPEG-12 transport streams.

A preferred embodiment of the system of the present invention comprises: a bit rate converter, a transmitter, a physical medium, and a receiver. The bit rate converter is preferably coupled to receive an input signal that is a video bit stream. The bit rate converter adjusts the bit rate of the input signal to match the communications channel and then outputs the bit stream to the transmitter. The transmitter is in turn coupled to the receiver by the physical medium. The transmitter sends the bit stream over the medium to the receiver, where the bit stream is received. Thus, the system of the present invention advantageously eliminates the need to decode and encode the bit stream before transportation over the channel. The bit rate converter eliminates the need for decompression and compression and preferably comprises: a separation unit, a decoder and extractor, a plurality of modification units, an encoder and a combining unit. The bit rate converter essentially adjusts the bit rate by making modifications to the video data portion of the bit stream. The bit rate converter first separates the video data portion of the bit stream and then decodes and extracts the video data. The data is then modified to change the bit rate, and then encoded and combined with the other signals that make up the bit stream.

A preferred method for transporting data over a communication channel comprises the steps of: converting a first bit rate of an input bit stream to a second bit rate, transmitting the bit stream at the second bit rate; and receiving the bit stream at the second bit rate. The converting a first bit rate of an input bit stream to a second bit rate preferably comprises the sub-steps of separating the bit stream into video, audio and data portions, decoding the video portion, extracting vectors and coefficients from the video portion, modifying the extracted data, encoding the modified data, and combining the encoded video data with the audio and data portions.

BRIEF DESCRIPTION OF THE DRAWINGS

FIG. 2A is a high level block diagram of one embodiment of a system constructed according to the present invention for transporting video data;

DETAILED DESCRIPTION OF THE PREFERRED EMBODIMENTS

Figure 1A:
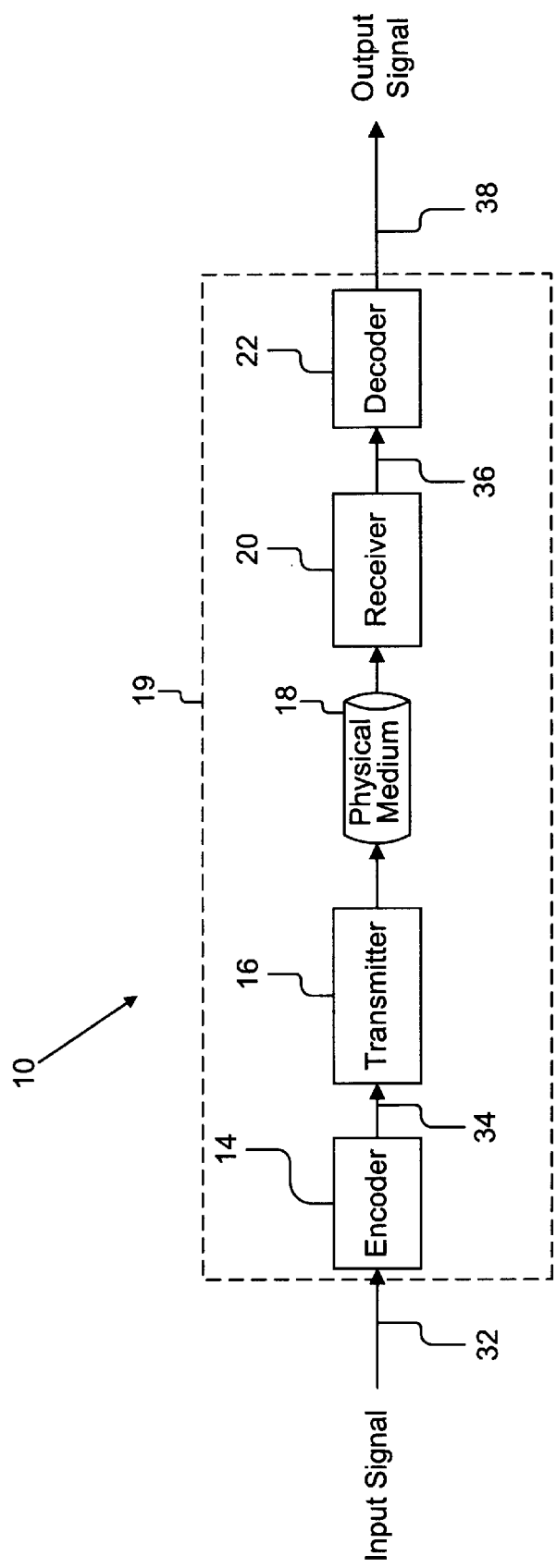
FIG. 1A is a block diagram of a prior art system for transmitting video data over a communication channel.

Referring now to FIG. 1A, a prior art system 10 for transmitting video data over a communication channel 19 is shown. The system 10 preferably forms a channel 19 using an encoder 14, a transmitter 16, a receiver 20, a physical medium 18 coupling the transmitter 16 to the receiver and a decoder 22. The encoder 14 receives an input bit stream 32 and compresses the input bit stream by encoding. The compress bit stream is then received by the transmitter 16 and output over the physical medium 18. The transmitter 16 can be any one of a variety of those known in the art for DSL networks or ATM networks. The signal sent over the physical medium 18 is received by the receiver 20 and input to the decoder 22. The decoder 22 restores the bit stream received by decompressing it into its original format.

Figure 1B:
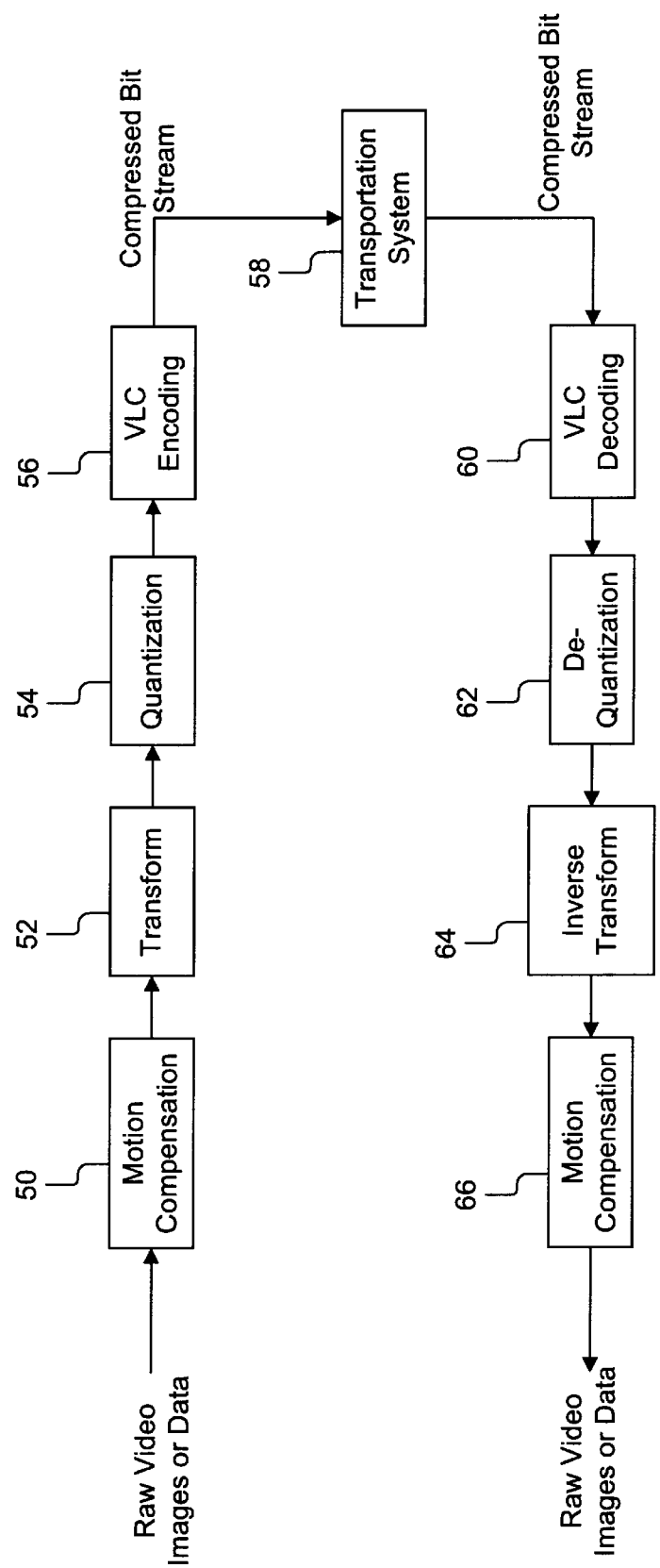
FIG. 1B is a block diagram of a prior art system for transmitting video data over a communication channel showing the encoding and decoding function in more detail.

FIG. 1B shows a block diagram of a prior art system for transmitting video data over a communication channel showing the encoding and decoding function in more detail. In particular, as shown, the encoding includes receiving raw video data and processing the raw video data with motion compensation 50, transform coding 52, quantization 54, and VLC encoding 56 to produce a compressed bit stream. The compressed bit stream can then, because of its reduced size, be transmitted over any one of a variety of prior art transportation systems 58. The decoding process is then applied to the compressed bit stream received from the transportation system 58 to obtain the original raw video images. The decoding includes VLC decoding 60, Dequantization 62, inverse transform coding 64, and motion compensation 66, all in a conventional manner.

FIG. 2A is a high level block diagram of one embodiment of a system 250 constructed according to the present invention for transporting video data. The system preferably comprises a compression unit 252, a bit rate converter 202, a transmission system 204 and a data formatting unit 258. The compression unit 252 receives video data and other data and produces a compressed bit stream. The compression unit may perform any one of a variety of types of compression including but not limited to MPEG compression, H.26X or H.32X compression for video conferencing, compression using proprietary video stream formats, and compression of non-real-time data bit streams. Those skilled in the art will recognize that the data formatting unit 258 is optional and provided only if additional data beyond the video data is being transmitted. The data formatting unit 258 may add such additional data by either providing it to the compression unit 252 as just described or by providing it directly to the transmission system 204 as also shown in FIG. 2A. The compression unit 252 provides a compressed bit stream to the input of the bit rate converter 202. The bit rate converter 202 advantageously adjust the bit rate to match the bandwidth of the transmission system 204. The bit rate converter 202 in its various embodiments will be described below in more detail, however, the bit rate converter 202 can perform conversion by adjusting or modifying the encoded bit stream syntax such as for the VLC decoding, the de-quantization, the inverse transform coding or the motion compensation. The output of the bit rate converter 202 is provided to the transmission system 204 which formats the data and transmits it over a physical channel (not shown). The transmission system 204 may be any one of a number of conventional transmission systems, including but not limited to ASDL, ATM/ADSL, ATM, ISDN links, Ethernets, public data networks, T1, T3, DS-3, OC-3, wireless/terrestrial networks, digital satellites, and digital cable networks, and particular ones are described below.

Figure 2B:
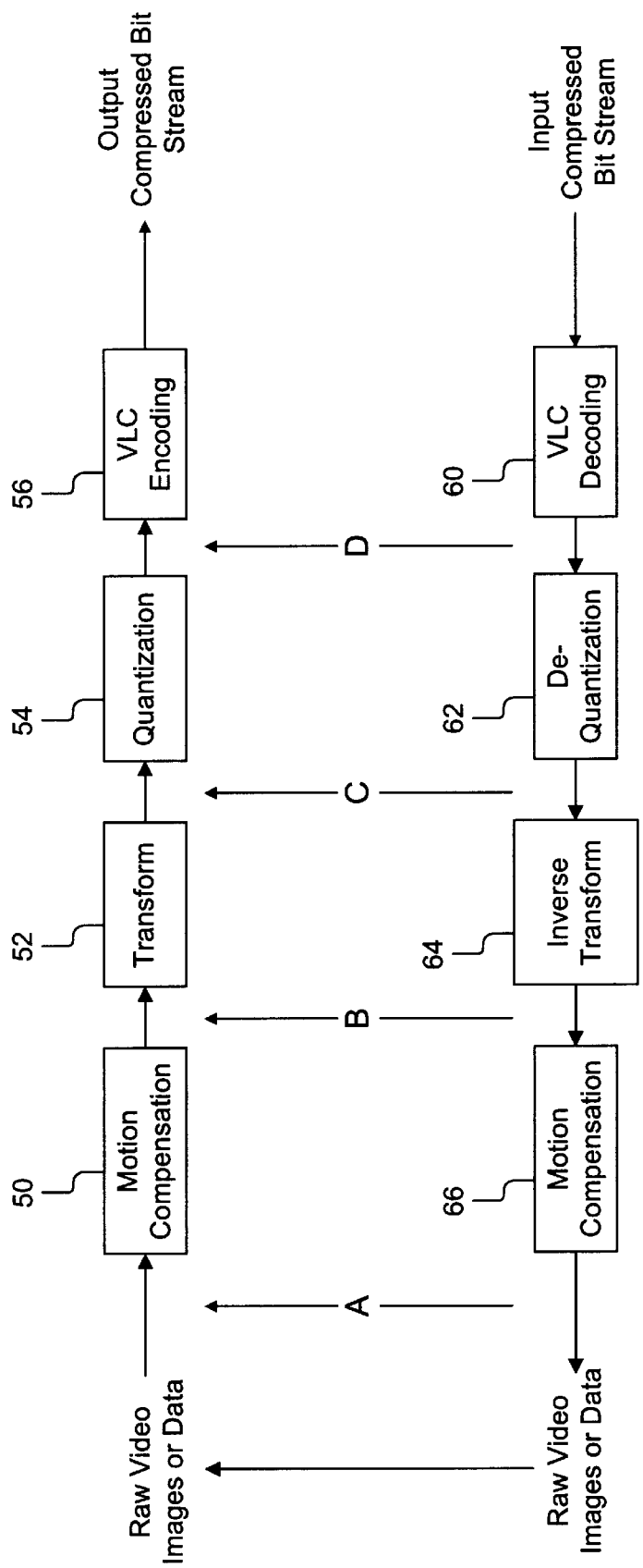
FIG. 2B is a block diagram of the preferred system for bit rate conversion according to the present invention, depicted using terms and reference numerals similar to the prior art system of FIG. 1B to show the advantages yielded by the present invention.

FIG. 2B is a block diagram of the preferred system for bit rate conversion according to the present invention, depicted using terms and reference numeral similar to the prior art system of FIG. 1B for ease of understanding and to show the advantages yielded by the present invention. In particular, the FIG. 2B is annotated with arrows to show the advantages of the present invention. As shown in FIG. 2B, the bit rate converter 204 includes a process of decoding, bit rate converting, and encoding in the compressed domain. However, based on the modification units (see FIGS. 4 and 5 below) used in the bit rate converter 204, the bit rate conversion process effectively follows one of the paths specified by arrows A, B, C or D. Generally, motion compensation is most computationally expensive, transform coding and inverse transform coding are also quite expensive. In general, without special hardware to perform these functions, motion compensation and transform coding will take over 80%–90% of the overall decode-encode computation load. The key to a simplified rate conversion scheme according to the present invention is therefore to bypass some of these expensive steps. For example, in FIG. 2B, if we take the path B, motion compensation is avoided. If we take path C, both motion compensation and transform coding are eliminated. If we take path D, quantization steps are also eliminated, in addition to motion compensation and transform coding. Of course, if we take path A, the entire decoding and encoding processes are performed, resulting in the most flexibility and quality potential, at the cost of being most expensive. Each of these paths can be specified by the use of different modification units, 404, 406, 408, 514, 516, 518 as will be described below with reference to FIG. 4 and FIG. 5.

While the present invention will now be described in the context of an Asymmetric Digital Subscriber Loop (ADSL) and ATM networks, those skilled in the art will realize that the present invention is applicable to a variety of other types of communication channels such as any xDSL includes ADSL, HDSL, VDSL, SDSL.

Asymmetric Digital Subscriber Loop, or ADSL, is a physical line code modulation scheme for transmitting digital bit stream over a single pair of plain old telephone system (POTS) grade twisted copper wires, that are usually noisy and are subject to outside interference. Several schemes have been developed to achieve high channel capacity of the said twisted copper wires. xDSL systems provide simple or full duplex raw bit pipes between the Central Office (CO) and the remote site receivers. The material content and the format of the bit stream or the protocols used by the connections being established by the bit pipe is immaterial to the xDSL system itself. In ADSL, the downstream link, from CO to remote site, has higher bandwidth than the upstream direction. Downstream channel capacity is typically up to 8 Mbps, and upstream channel capacity is up to about 1 Mbps; the actual channel capacity depends on the noise level of the wires and the distance between the transmitter and the receiver.

Because broadcast video quality can be achieved with compressed video, such as MPEG-2, at 3–6 Mbps, ADSL provides an ideal delivery scheme for compressed digital video and other high speed data connecting COs with remote sites, which can be either consumer subscribers or business establishments.

However, because of the variation in physical line conditions due to both the physical distance of the connection and the noise conditions of the lines, the ADSL transmission schemes do not specify channel capacity in either direction, rather the channel capacity is determined at connection set up time via channel initialization and training by the transceivers at the CO location and at the remote locations, in a conventional manner. The initialization and training process determines the proper coding configuration best matched to the current channel condition in order to achieve the maximum channel capacity. During the connection, due to change in line condition or due to loss of data, the transceivers may also re-initialize and retrain to settle on the new coding configuration.

Figure 2C:
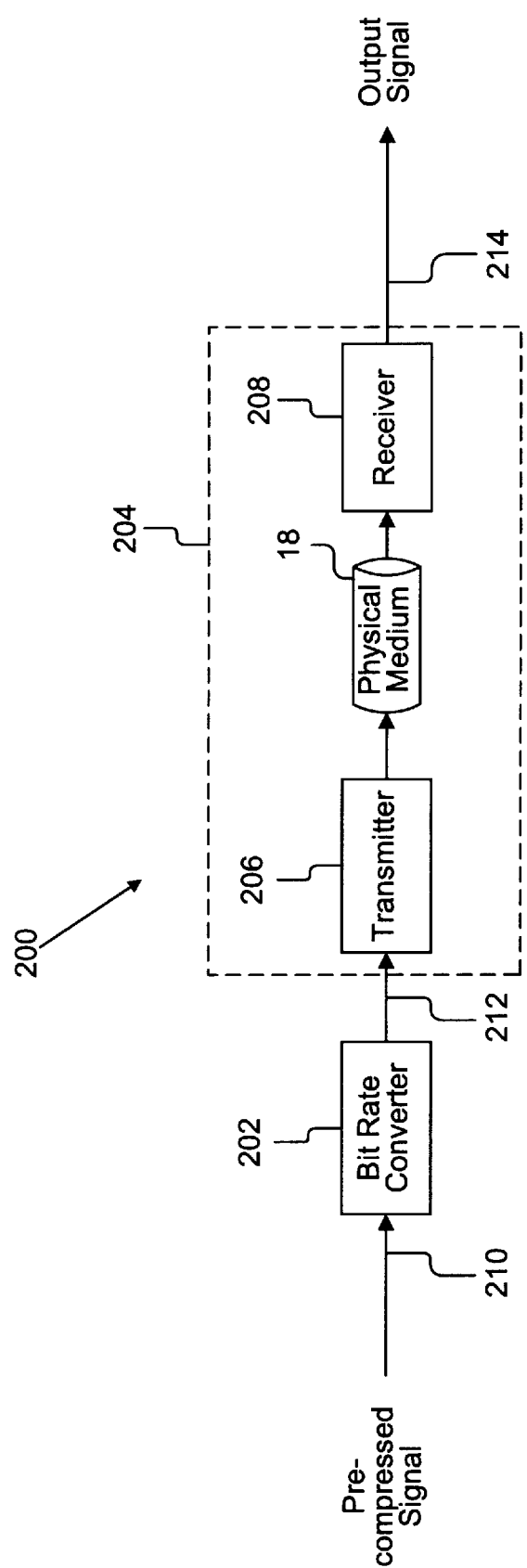
FIG. 2C is a block diagram of a first and preferred embodiment of a system, constructed according to the present invention, for transporting video data including a communication channel.
Figure 9:
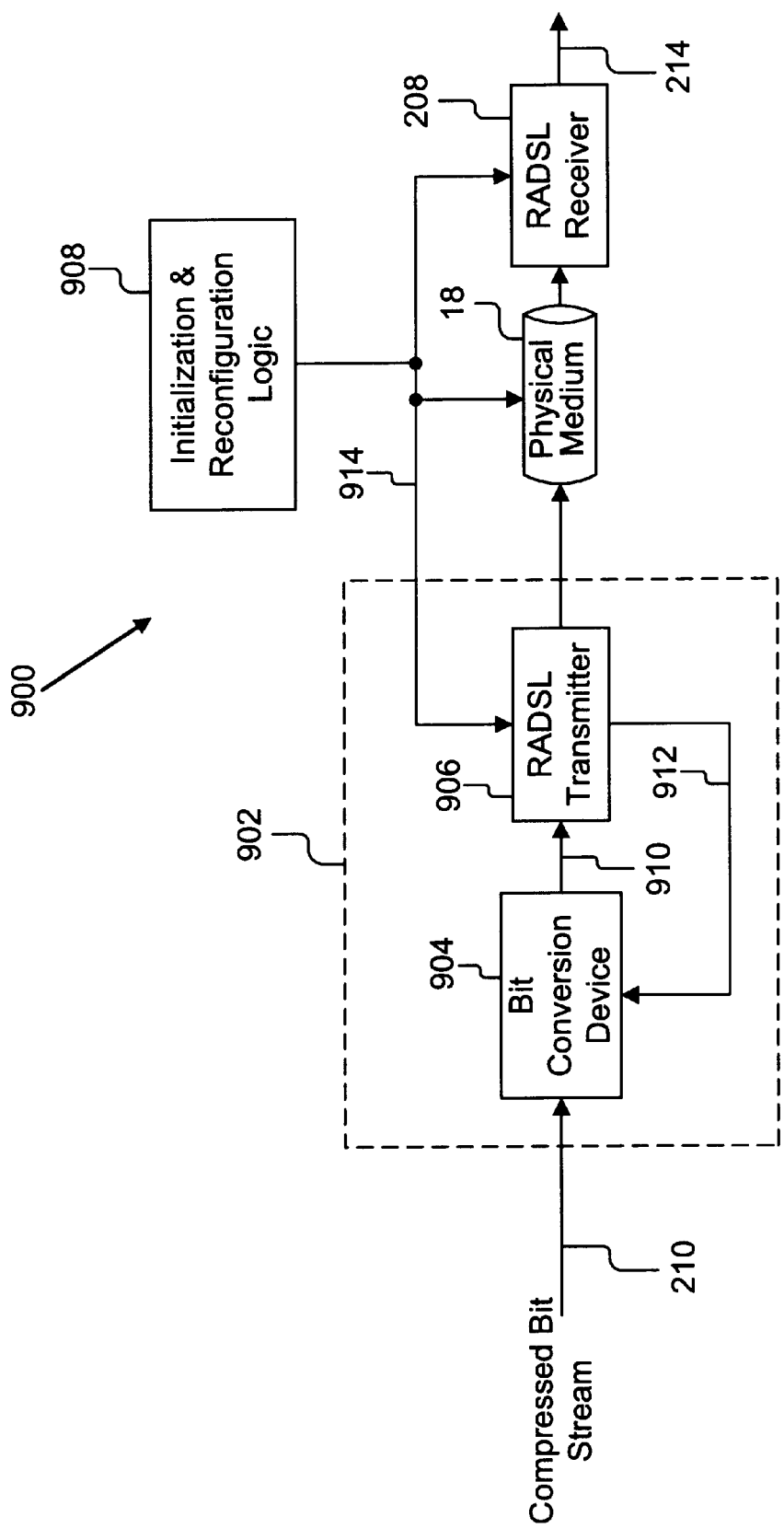
FIG. 9 is a block diagram of a third embodiment of a system for transporting video data integrated within the communication channel, in particular, a rate adaptive asymmetric digital subscriber loop.

In all the ADSL figures and discussions for the present invention below, it is important to point out that the ADSL channel is bi-directional, even though the present invention is described and shown by focusing on a single direction for ease of understanding. The present invention focuses on the transmission in a direction from a central office to a customer as shown in FIGS. 2C and 9 from 210 to 214. In other words, the transmitter device (such as transmitter 906) is also a receiver device in the reverse direction, from the customer to the central office (from 208 to 206). For video over ADSL, the bit rate conversion over ADSL in the customer to central office direction appears pedantic but conceptually possible, though at a lower maximum bit rate. Still more particularly, if transmitter 906 in FIG. 9 is a transmitter as part of ATU-C (central office), then it must also be a receiver as part of ATU-C (remote). If box 906 is treated as part of an ATU-R then the end subscriber is sending bit rate converted video up-stream to central office.

Referring now to FIG. 2C, a first and preferred embodiment of a system 200 for transporting digital video data constructed according to the present invention is shown. The system 200 preferably comprises a bit rate converter 202 and a channel 204. The channel 204 is further includes a transmitter 206 coupled by a physical medium 18 to a receiver 208. This embodiment of the system 200 is particularly advantageous because, as can be seen from FIG. 2C, the need for the encoder and decoder is eliminated. The bit rate converter 202 simply adjusts the bit rate output to match the capacity or bandwidth of the channel 204. More specifically, the bit rate converter 202 has an input coupled to line 210 to receive an pre-compressed signal of digital video data. The bit rate converter 202 adjust the bit rate at which the bit stream is provided to the transmitter 206. The output of the bit rate converter 202 is coupled by line 212 to the input of the transmitter 206. The output of the transmitter 206 is coupled by the physical medium 18 to the input of the receiver 208. The physical medium may be any one of a variety of types, but is preferably twisted pair. The output of the receiver 208 is coupled to line 214 and provides the output signal which is also a compressed signal but with a different bit rate. As illustrated in FIG. 2C, the bit rate converter 202 and the transmitter 206 are separate devices or if performed in software separate modules.

Figure 3:
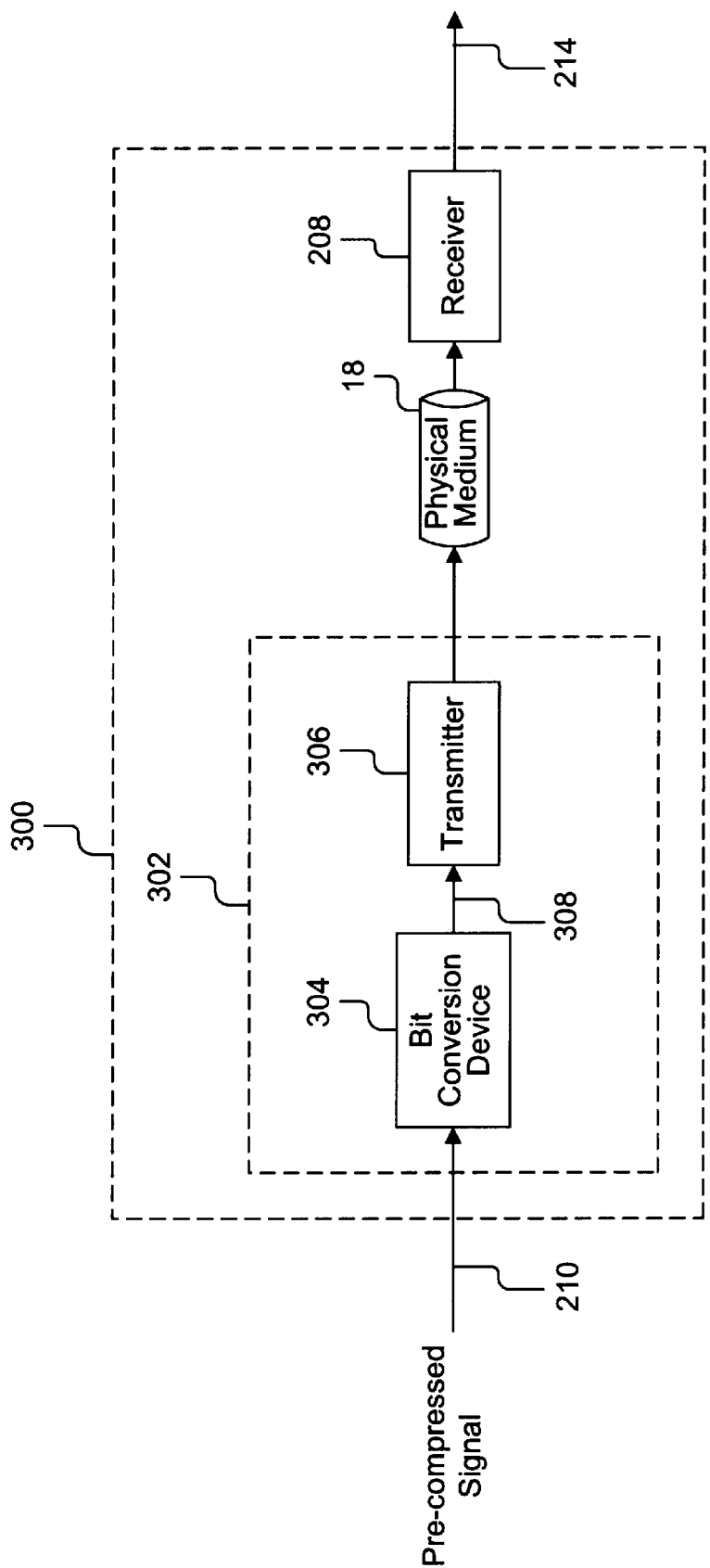
FIG. 3 is a block diagram of a second embodiment of a system for transporting video data integrated within the communication channel.

Referring now to FIG. 3, a block diagram of a second embodiment of a system 300 for transporting video data integrated within the communication channel 300 is shown. In the second embodiment 300, the bit rate conversion device or converter 304 is integrated with the transmitter 306 to form a single device 302. Like the first embodiment, the second embodiment 300, receives a pre-compressed signal on line 210. Line 210 is coupled to an input of the bit rate conversion device 304. The output of the bit rate conversion device 304 is in turn coupled to the input of the transmitter 306 by line 308. The output of the transmitter 306 is likewise coupled to the physical medium 18 and the receiver 208. This embodiment 300 is particularly advantageous because it allows integration of the bit rate conversion with the transmitter into a single high performance DSP device.

Figure 4:
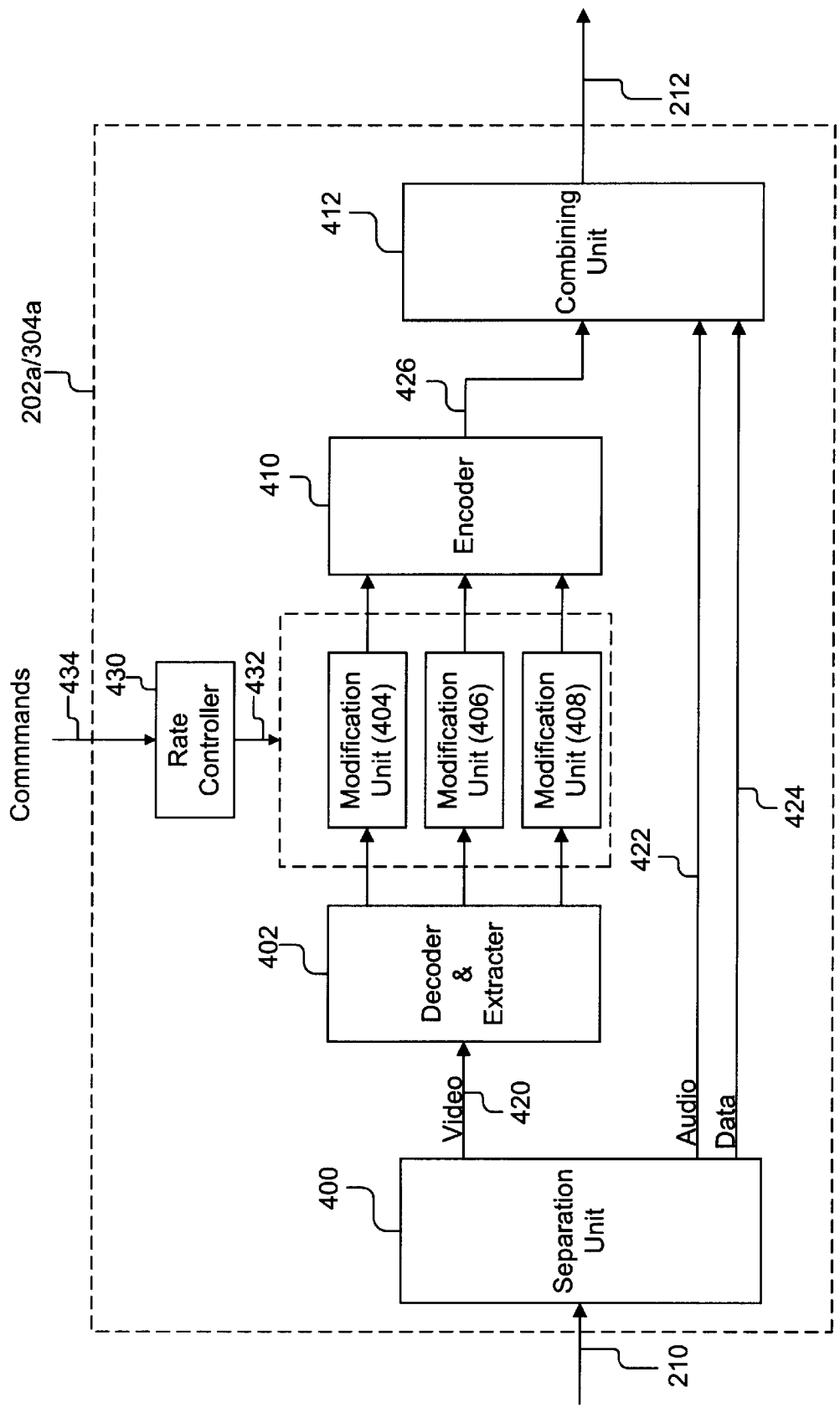
FIG. 4 is a first embodiment of a bit rate conversion device according to the present invention.

Referring now to FIG. 4, a first embodiment of a bit rate conversion device 202a/304a according to the present invention is shown in more detail. The present invention advantageously uses bit rate conversion to match the rate of the bit stream to the capacity of the channel 204. Bit rate conversion of compressed video bit stream refers to the process performed on a pre-compressed video bit stream which, when applied to the bit stream, results in a different bit usage than the originally compressed bit stream. In a typical scenario (see FIG. 2C), the new bit rate is smaller than the original bit rate, but sometimes the resulting bit rate can also be greater than the original bit rate. When the digital video is first compressed, the encoder must assume a particular bit rate profile, whether it is constant bit rate (CBR) or a variable bit rate (VBR). The word "profile" refers to the fact that bit rate may not be constant, but variable under certain constraints, such as peak bit rate, average bit rate, minimum bit rate, etc. For example, a constant bit rate stream at 4 Mbps does not have the same bit rate profile as a variable bit rate stream at an average of 4 Mbps but has larger maximum bit rate and smaller minimum bit rate, respectively. In other scenarios (see FIG. 6 and 7), the compressed bit stream may be delivered to different transmission channels each having a different channel capacity, or the compressed bit stream may be further multiplexed with other bit streams to share the same channel capacity. For example, a compressed video stream at 6 million bits per second, or 6 Mbps, may need to be transmitted over a channel capable of delivering only, say, 5.5 Mbps. Therefore, if the same bit stream is transmitted over the channel, 0.5 Mbps must be removed before the transmission. As described earlier, arbitrarily removing the bits from the compressed bit stream is not acceptable. The bit rate conversion process is intended to remove bits from the compressed bit stream so that the resulting bit stream is still compliant to the given compression syntax, thus can be decoded by the receiver, albeit at a possibly lower quality than the originally compressed bit stream.

Even though a compressed bit stream typically comprises a combination, called a multiplex, of compressed audio, video and auxiliary data bit streams, the bit rate conversion process described in this invention refers specifically to procedures applied on compressed video bit stream. There are several ways to increase or decrease the bit rate of pre-compressed video bit stream. The present invention can alternatively use any one of the following methods for bit rate conversion.

1. Removing or insertion of filler packets/frames (in the case of MPEG-2 transport streams the filler packets are null transport packets);
2. Removing or inserting stuffing bits into the compressed video stream (in the case of MPEG, H.261, H.262 or H.263, stuffing bits can inserted or removed at the end of the encoded video frames);
3. Parsing and extracting the DCT coefficients, generate variable length codes, and re-combine them with the motion vectors in the originally compressed bit streams. In addition, reference frames may optionally be reconstructed in the frequency domain and re-quantization is performed.
4. Discarding data used to represent selected video frames and generate frame repeat information in the bit stream so that the resulting bit stream contains information to instruct the decoder to repeat the dropped frames to maintain continuous display;
5. First decode the bit stream into analog video frames and then encode the video frames back at a different bit rate suitable for transmission.

As best shown by FIG. 4, a first and preferred embodiment for the bit rate converter 202a/304a comprises: a separation unit 400, a decoder and extracter 402, a plurality of modification units 404, 406, 408, an encoder 410, a combining unit 412 and a rate controller 430. While the present invention will now be described as an apparatus composed of units, those skilled in the area will recognize that the present invention encompasses a method, process or software having as steps the actions performed by each unit and described below.

The separation unit 400 has an input and a plurality of outputs. The input of the separation unit 400 is coupled to line 210 to receive an input of pre-compressed digital video bit stream. The separation unit 400 preferably de-multiplexes the system layer stream, removing filler packets/frames as appropriate, to obtain the video bit stream, the audio bit stream and a data bit stream. The video bit stream is provided on a first output coupled to line 420, the audio bit stream is provided on a second output coupled to line 422, and a data bit stream is provided on a third output coupled to line 424. Those skilled in the art will understand the operation of the separation unit 400, based on the protocol being used for the bit stream. Based on the protocol, the bit stream can divided into the sub-streams according to the present invention.

The input of the decoder and extracter 402 is coupled to line 420 to receive the video signal from the separation unit 400. The decoder and extracter 402 preferably parses all timing, programming and other auxiliary information and removes all stuffing data bits as appropriate. This parsing step produces a number of streams that in turn need to be decoded. In the preferred embodiment, three streams are produced, one for transform coefficients, one for motion vectors, and a final one for auxiliary information bits. The decoder and extracter 402 then decodes each respective stream with a suitable decoder, such as variable length decoding. Each of the decoded streams is provided on a respective output of the decoder and extracter 402.

As shown in FIG. 4, the plurality of outputs of the decoder and extracter 402 are each coupled to a respective modification unit 404, 406, 408. The modifications units 404, 406, 408 are used to reduce the number of bits needed for the transform (such as discrete cosine transform) coefficients, motion vectors, and other auxiliary information bits. As has been noted above, any one of a variety of methods can be used to modify the number of bits used to represent each portion of information for the three types, and thereby adjust the bit rate of the stream. The modification units 404, 406, 408 are controlled by the rate controller 430. The rate controller 430 has an input and an output. The input of the rate controller 430 is coupled to line 434 to receive a control signal indicating the amount of conversion or the desired output bit rate for the bit rate converter 202a/304a. For example, line 434 may be coupled to line 912 to receive a rate value from a RADSL transmitter 906 in an ADSL embodiment or to line 1112 to receive a rate value from an ATM network 1106 in an ATM environment. The rate controller 430 provides a control signal to each of the modification unit 404, 406, 408 via line 432 (shown by diagram as a dashed box). The control signal specifies the amount of modifying each of the modifications units 404, 406, 408 performs to achieve the desired output bit rate from the bit rate converter 202a/304a. The modification units 404, 406, 408 may be similar to those described below for FIG. 5.

The output of each of the modifications units 404, 406, 408 is coupled to the respective input of the encoder 410. The encoder 410 preferably performs variable length coding of all the bits, and then outputs the encoded stream on line 426.

The combining unit 412 has three inputs that are respectively coupled to lines 426, 422 and 424, to receive the encoded stream, an audio stream and a data stream. The combining unit 412 preferably performs multiplexing of the bits back into compliant bit stream and insert stuffing bits, filler packets as appropriate. The output of the combining unit 412 is coupled to line 212 and forms the output of the bit rate converter 202a/304a. The output of the combining unit 412 provides a signal that is converted to match the rate of the channel.

Figure 5:
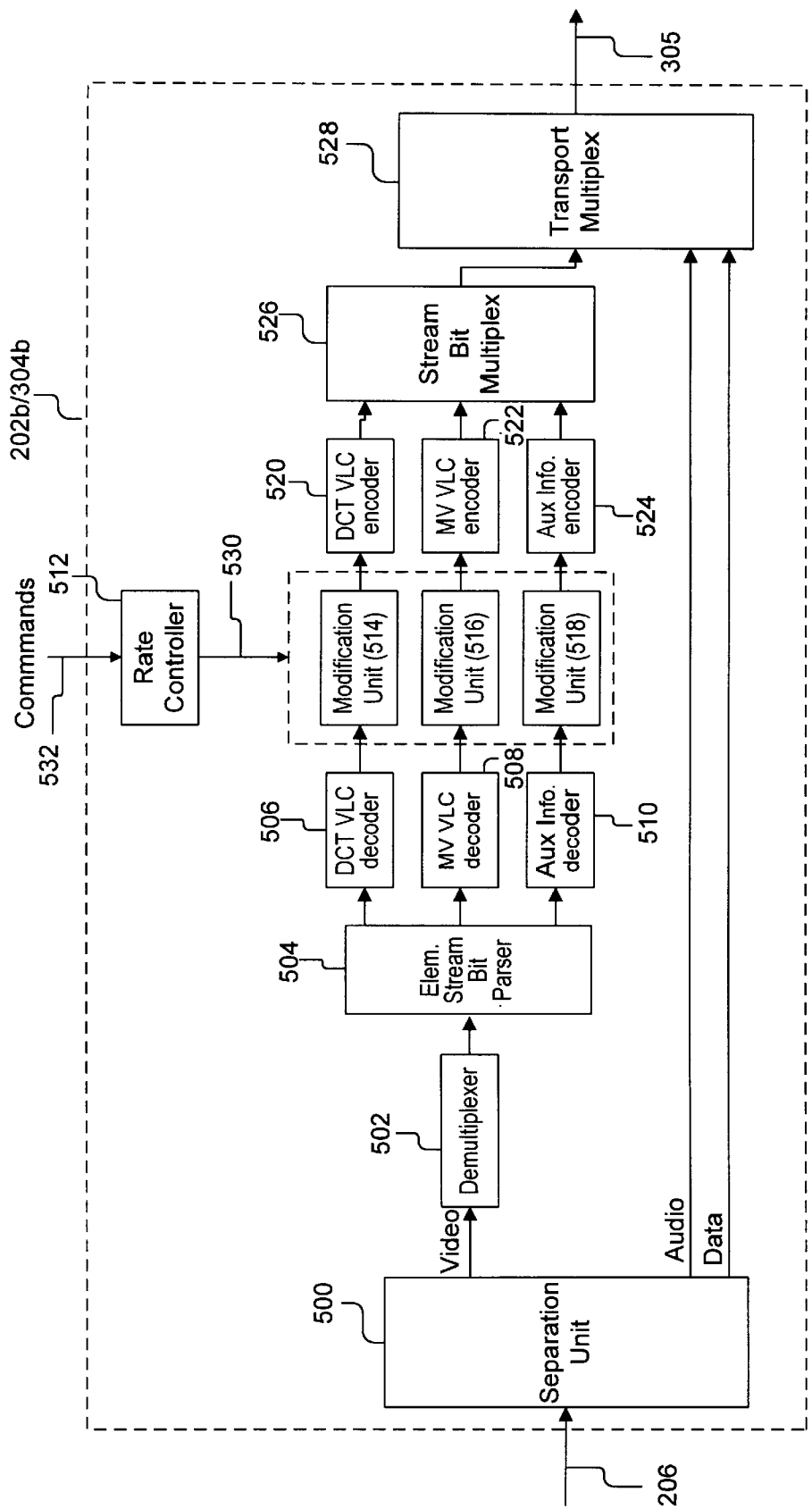
FIG. 5 is a second and preferred embodiment of a bit rate conversion device according to the present invention.

Referring now to FIG. 5, a second and preferred embodiment of a bit rate conversion device 202b/304b according to the present invention is shown. The bit rate conversion device 202b/304b is adapted for use on a MPEG-2 transport stream. The second embodiment of the bit rate conversion device 202b/304b preferably comprises a separation unit 500, a de-multiplexer 502, a elementary stream bit parser 504, a DCT VLC decoder 506, a motion vector VLC decoder 508, an auxiliary information decoder 510, a rate controller 512, a plurality of modification units 514, 516, 518, a DCT VLC encoder 520, a motion vector VLC encoder 522, an auxiliary information encoder 524, a stream bit multiplexer 526, and a transport multiplexer 528.

The separation unit 500 first receives the pre-compressed video data stream. The separation unit 500 is similar as has been described above, and produces a video transport stream, an audio stream, and an data stream. The audio stream and data stream are output directly to the transport multiplexer 528 which recombines these streams with the rate converted video.

The de-multiplexer 502 is coupled to receive the video stream from the separation unit 500. The de-multiplexer 502 extracts a video elementary stream payload from the video transport stream and in turn sends the video elementary stream payload to the elementary stream bit parser 504. The elementary stream bit parser 504 receives the output of the de-multiplexer 502 and divides it into a transform coefficient component, a motion vector component, and an auxiliary information component. Each of these components is output to a respective decoder 506, 508, 510. For example, the discrete cosine transform (DCT) variable length coding (VLC) decoder 506 is provided for the transform coefficient component, the motion vector (MV) variable length coding (VLC) decoder 508 receives the motion vector component, and the auxiliary information decoder 510 receives the auxiliary information component.

As shown in FIG. 5, each of the modification units 514, 516, 518 is coupled to a respective decoder 506, 508, 510 as the source of information to be modified. The present invention also provides the rate controller 512 to control the bit rate at which the transport multiplexer 528 outputs data. The rate controller 512 preferably determines the bit usage of each video frame so that the resulting output bit stream maintains a desired bit rate profile. In the case of CBR video, the rate controller 512 ensures that the resulting output compressed bit stream can be delivered via a constant bit rate channel under the standard decoder buffer constraint. The present invention performs rate control by adjusting the quantization factor imbedded in the video bit stream, however, those skilled in the art will realize that other methods of rate control could be used. The rate controller 512 is preferably coupled to receive commands that specify the rate for the output stream, and therefore, the rate by which the modification units 514, 516, 518 must adjust the input data streams. For example, when the rate controller is used in the context of RADSL, the input to the rate controller 512 is coupled to line 532 which in turn is coupled to receive feedback from an RADSL transmitter or ADSL modem to control the target output bit rate such as the one shown in FIG. 9 (e.g., line 532 is coupled to line 912). In such an arrangement, the signal provided on line 532 is a value or rate for the modification units 514, 516, 518 to output data.

The rate controller 512 is shown diagramatically in FIG. 5 as being coupled to all three of the modification units 514, 516, 518 by control signal line 530. While the rate controller 512 has been described as being a discrete device, those skilled in the art will realize that the rate controller 512 could be software that provides a control signal to the modification units 514, 516, 518.

The modification units 514, 516, 518 can be used to provide a variety of bit rate conversions, and the present invention is not limited to the ones detailed below. The modification units 514, 516, 518 are used to modify the encoded bit stream syntax and bit usage. In addition to the functionality already discussed in the application, other functions the modification units 514, 516, 518 may perform include and involve modules, such as:

1) Selectively scaling or setting transform coefficients to zero (equivalent to filtering) using modification unit 514, then encoding the transform coefficients back into VLC using the DCT VLC encoder 520, to produce a different bit rate at the output of the transport multiplexer on line 305. This approach corresponds to taking the processing path D in FIG. 2.

2) selectively discarding entire coded frames using the decoders 506, 508, 510 and modification units 514, 516, 518 to produce a different coded video frame rate. This approach corresponds to taking the processing path D in FIG. 2.

3) Extracting and changing the quantization scale factors using the auxiliary information decoder 510 and the modification unit 518, and then using the changed quantization scale factors to encode transform coefficient back into VLC with the encoders 520, 522, 524, to produce a different bit rate usage at the output of the transport multiplexer on line 305. This approach corresponds to taking the processing path C in FIG. 2.

4) Completely decoding the bit stream and performing inverse transform coding (such as inverse DCT), however, preserving the same motion vectors extracted from the input bit stream using the MV VLC decoder 508, and then using the motion vectors to perform predictive motion compensated encoding, performing transform coding (such as DCT), followed by VLC coding with the DCT VLC encoder 520 to produce a bit stream at a different bit rate. This approach corresponds to taking the processing path B in FIG. 2. This approach would also require the addition of an inverse DCT module coupled between the DCT VLC decoder 506 and the modification unit 514, and the addition of a DCT module coupled between the modification unit 514 and the DCT VLC encoder 520. Essentially, in this approach, the modification unit 514 is performing image reconstruction and motion residual construction.

5) Changing the resolution of the video images by directly re-mapping the decompressed transform coefficients from one resolution to another using modification unit 514 and then encoding the resulting coefficients back into VLC using encoders 520, 522, 524. This approach corresponds to taking the processing path B in FIG. 2.

6) completely decoding the bit stream, adding low pass spatial filtering to the decoded digitized video images and re-encoding them back to compressed forms, to produce a lower bit rate. This approach corresponds to taking the processing path A in FIG. 2.

The outputs of the modification units 514, 516, 518 are in turn coupled to respectively to the DCT VLC encoder 520, the motion vector VLC encoder 522, the auxiliary information encoder 524. Each of the encoders 520, 522, 524 codes the data back into the compressed format. The outputs of the encoders 520, 522, 524 are then combined by stream bit multiplexer 526, and then again combined with the audio and data by the transport multiplexer 528. Those skilled in the art will recognize from FIGS. 4 and 5 that the present invention can be applied to bit stream based on other transform schemes, and MPEG-2 is used only by way of example.

Figure 6:
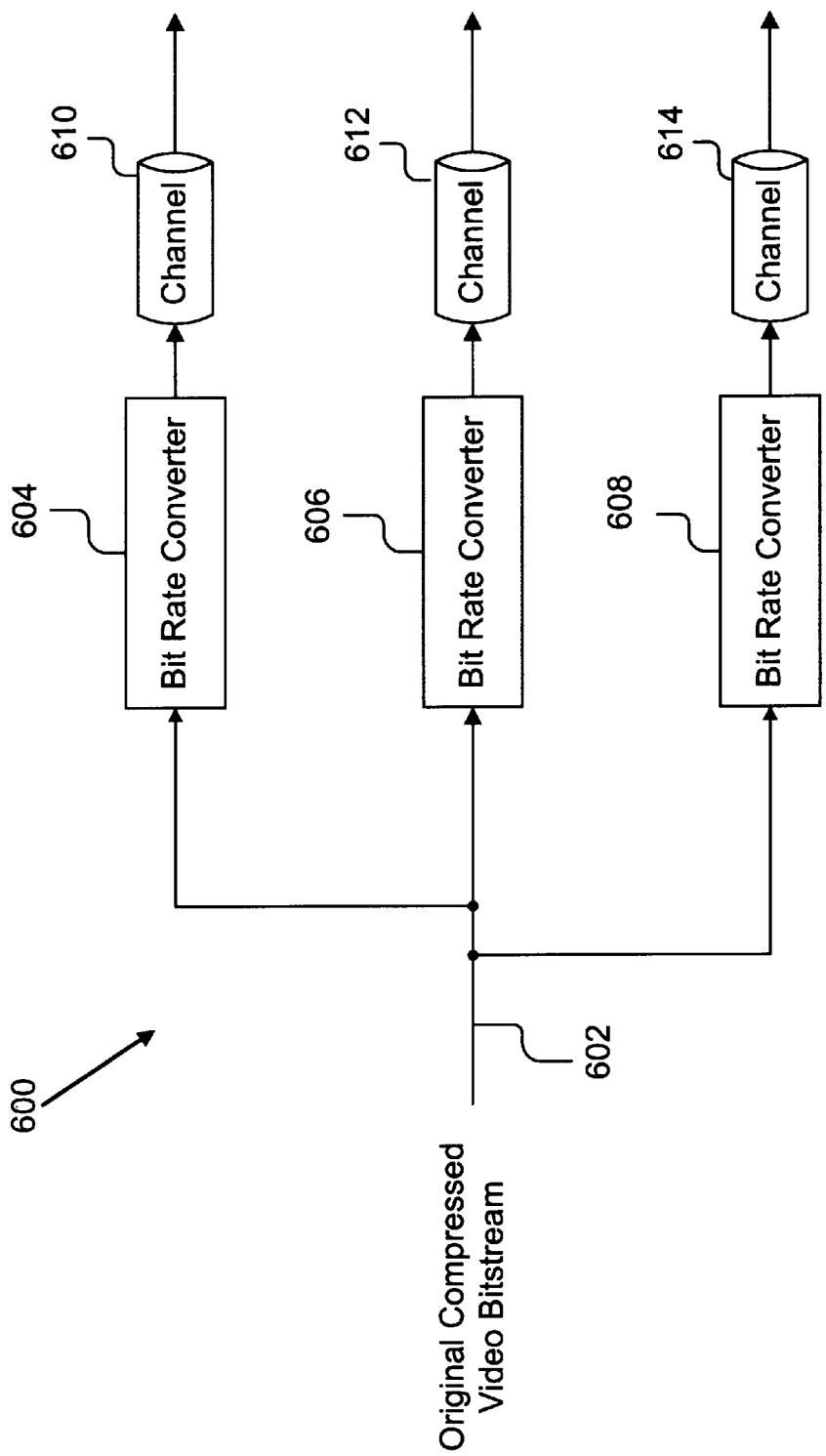
FIG. 6 is a block diagram of a system including a plurality of bit rate converters for sending a single stream of video data over a plurality of respective channels.
Figure 7:
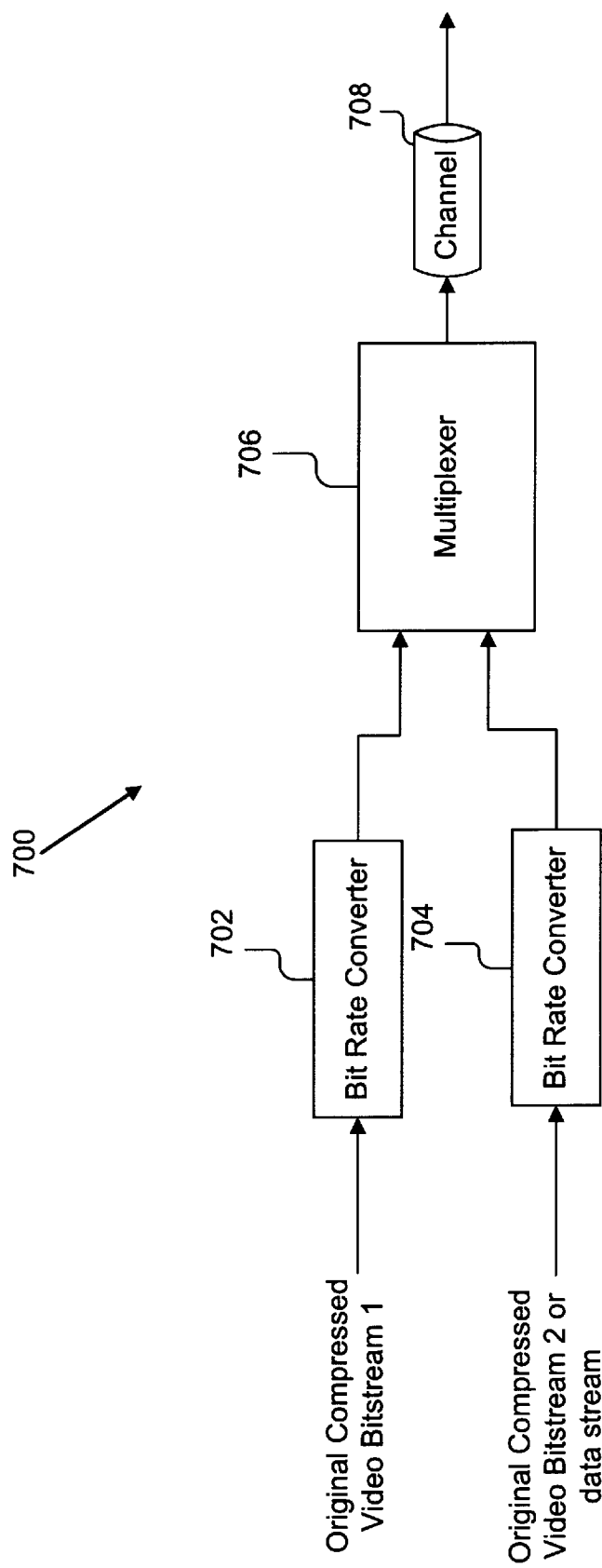
FIG. 7 is a block diagram of a system including a plurality of bit rate converters for sharing the bandwidth of a single communication channel.
Figure 8:
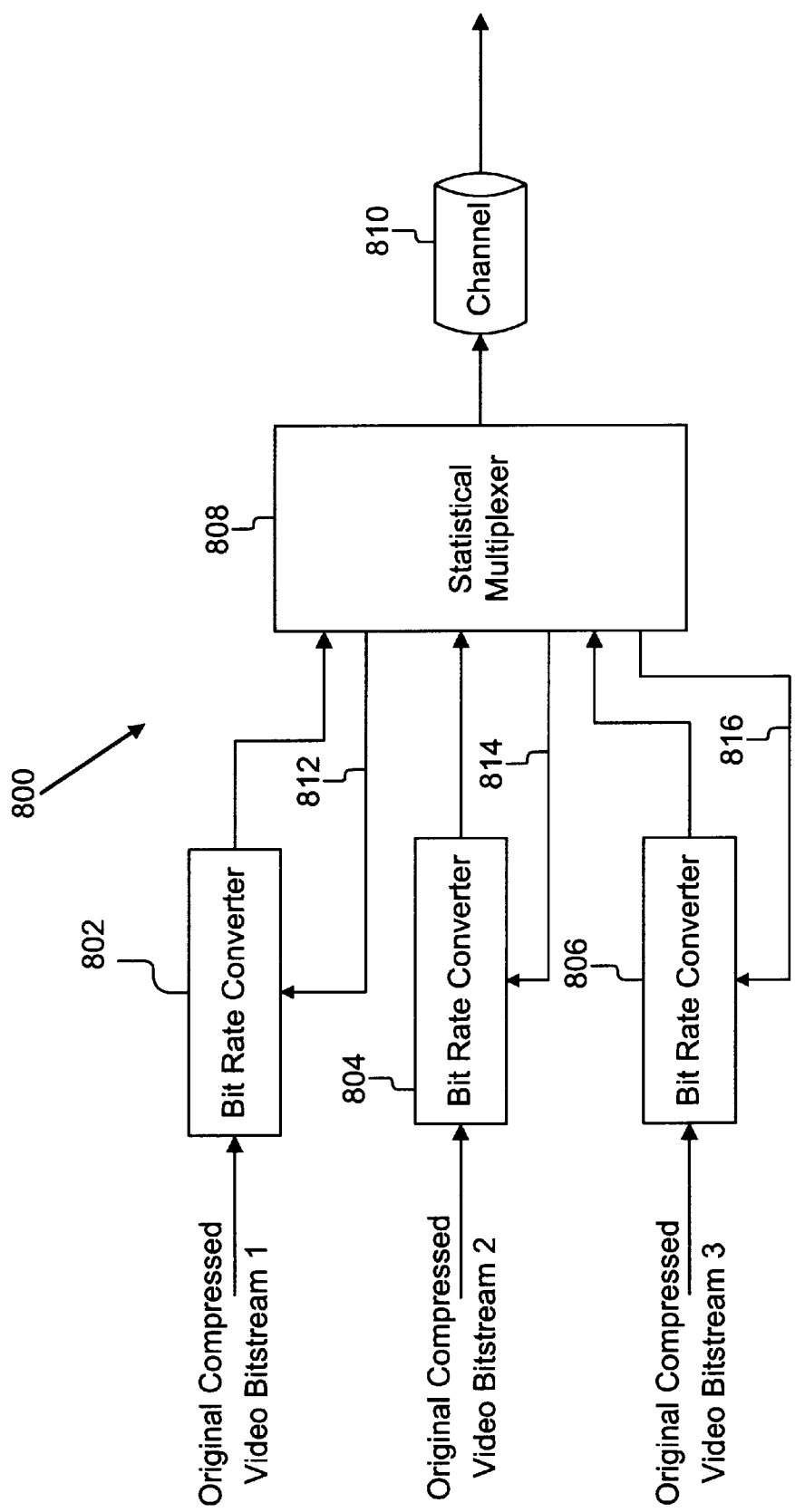
FIG. 8 is block diagram of a system including a plurality of bit rate converters for performing a statistical multiplexing for use of a single communication channel.

Referring now to FIGS. 6, 7 and 8, three systems where the rate converter/channel combination of the present invention is particularly advantageous will be described. The present invention focuses on schemes that combine rate conversion with the transmission channel. The combination allows lossless transmission of rate converted bit stream even when the original bit rate and available channel capacity are mismatched. The combination also enables flexible bandwidth sharing between the given bit stream and other data bit streams.

Referring now to FIG. 6, a block diagram of a system 600 including a plurality of bit rate converters 604, 606, 608 for sending a single stream of video data over a plurality of respective channels 610, 612, 614 is shown. In some multimedia delivery systems, compressed video programs are delivered to numerous digital receiver/decoders via one or more digital transmission channels. In such multi-cast situations, the same compressed video bit stream 602, which has a predetermined bit rate R, must be delivered to different end receiver/decoders via different channels 610, 612, 614, and some of the channels 610, 612, 614 may not have a capacity sufficient to transmit the digital stream at the requested bit rate R. In these cases, the present invention applies the bit rate conversion process to the originally compressed bit stream so that the resulting bit rate is no more than the channel capacity. The system 600 preferably provides a respective bit rate converters 604, 606, 608. Each of the bit rate converters 604, 606, 608 is preferably adapted to convert the incoming original compressed bit stream to a bit stream with a rate that is appropriate for the respective channel 610, 612, 614 since each different channel 610, 612, 614 can have different capacity. For example, if the first channel 610 has a channel capacity R1, which is less than R, the bit rate converter 604 converts the original compressed bit stream to have a rate that matches the channel 610 capacity, namely R1. Similarly, if the second channel 612 has a capacity R2, where R2 is less than R but greater than R1, the bit rate converter 606 converts the original compressed bit stream to have a rate that matches the channel 612 capacity, namely R2. Finally, if the third channel 614 has a capacity R3, and R3 is equal to R, then the bit rate converter 608 simply passed the original compressed bit stream through the channel 614.

Referring now to FIG. 7, a block diagram of a system 700 including a plurality of bit rate converters 702, 704 for flexible sharing the bandwidth of a single communication channel 708 with other types of data streams is shown. In some multimedia delivery systems, extraneous bit stream data may arrive at the facility and must be multiplexed with the existing bit stream before being delivered to the receiver/decoder. However, the total available channel bandwidth may not be sufficient to accommodate the combined bandwidth requirement. In this case, bit rate conversion process may be applied to the originally compressed video bit stream so that the resulting combined bit rate is no more than the channel capacity. Such a system 700 includes a first bit rate converter 702, a second bit rate converter 704, a multiplexer 706 and a channel 708. The first bit rate converter 702 is preferably coupled to receive a first original compressed video stream and output a rate modified bit stream to the multiplexer 706. The second bit rate converter 704 is preferably coupled to receive a second compressed video stream or data stream and outputs a second rate modified bit stream to the multiplexer 706. The multiplexer 706 combines the two inputs and outputs a single bit stream over the channel 708. According to the preferred embodiment of the present invention, the output of the first bit rate converter 702 and the second bit rate converter 704 are such that when they are multiplexed together they are less than or equal to the capacity of the channel 708. Therefore, by performing bit rate conversion on the two incoming streams, the present invention ensures lossless transmission since the channel capacity will not be exceeded. More particularly, the multiplexer 706 determines an intended bit rate profile for the first bit stream so that the converted bit rate is less than available channel bandwidth to allow the second data stream to take up any remaining bandwidth. The multiplexer 706 preferably includes a scheme that gives higher priority to the first bit stream so that when there is insufficient bandwidth, the second data bit stream is discarded. For examples, such a scheme is particularly advantageous where a time critical bit stream is provided to the first bit rate converter 702 such as real-time compressed video, and non time-critical data is provided to the second bit rate converter 704 such as a TCP/IP based data stream. Essentially, the lower priority data stream picks up the slack bandwidth left over by the high priority bit stream. The multiplexer 706 first determines bandwidth given to the real-time bit stream, it then uses the priority scheme to provide leftover bandwidth to the second data stream.

Referring now to FIG. 8, yet another application of the present invention is shown by the block diagram of a system 800 including a plurality of bit rate converters 802, 804, 806 for performing a statistical multiplexing for use of a single communication channel 810. In some applications, such as a satellite transponder, the analog spectrum of a coaxial cable is used to transmit digital video, or a wireless channel may be used to carry multiple compressed bit streams. In these cases, a multiplexing scheme must be used to allow logical sharing of the same channel bandwidth. If all of the bit streams participating in the multiplexing comply with the compression system layer standard, such multiplexing can be achieved within the compression system layer. Otherwise, the bit stream must be multiplexed using different schemes. The need for bit rate conversion arises when the sum of the individual bandwidths does not fit into the available channel capacity. In this case, the bit rate conversion scheme adjusts the compressed video bit stream in the multiplex such that the resulting multiplexed bit stream has a total bit rate no greater than the channel capacity. This process is called statistical multiplexing because in general the bit rate usage of an individual bit stream is not deterministic, but bit rate fluctuations compensate among different bit streams to achieve a constant channel bandwidth usage. As shown in FIG. 8, the preferred embodiment of such a system 800 comprises a plurality of bit rate converters 802, 804, 806, a statistical multiplexer 808 and a communication channel 810. Each of the bit rate converters 802, 804, 806 is preferably coupled to receive a respective original compressed bit stream and outputs a rate converted bit stream. Each of the bit rate converters 802, 804, 806 has its output coupled to an input of the statistical multiplexer 808 to provide the rate converted bit streams. Each of the bit rate converters 802, 804, and 806 also has another input coupled to receive feedback from the statistical multiplexer 808 via lines 812, 814 and 816, respectively. The statistical multiplexer 808 combines the three input bit streams into a single bit stream at its output. Through use of these feedback lines 812, 814 and 816, the statistical multiplexer 808 is able to provide a control input to selectively activate the bit rate converters 802, 804, 806 according to the available bandwidth in the channel 810. In the preferred embodiment of the present invention, the statistical multiplexer 808 outputs a data stream that is an MPEG2 transport stream and conforms to the standard MPEG2 format. The statistical multiplexer 808 may have a variety of embodiments and use different algorithms or bases to perform the multiplexing. For example, specific bit streams may be designated to have a priority in receiving a certain percentage of channel availability. Just as an example, video bit stream 1 may have a priority, and therefore be controlled via line 812 to have a minimum amount of rate conversion, while the other video bit streams 2 and 3, may have lower priorities, and therefore be subject to greater bit rate conversion using lines 814, 816. Furthermore, the statistical multiplexer 808 may also use time of transmission or scene content for video data to determine the priorities for channel usage, and use the control lines 812, 814, and 816 accordingly to apply various bit conversions rates to maintain maximum use of the channel capacity. In an alternate embodiment, the statistical multiplexers may be of the type constructed by General Instruments, DiviCom and other companies to control realtime encoders. While the system 800 is shown as multiplexing between only three input streams, those skilled in the art will recognize that any number of streams could be multiplexed. Finally, the output of the statistical multiplexer 808 is coupled to the channel 810.

Referring now to FIG. 9, a third embodiment of a system 900 for transporting video data integrated within the communication channel, in particular, for a rate adaptive asymmetric digital subscriber line (RADSL), is shown. The present invention is directed toward the integration of bit rate conversion schemes with ADSL rate adaptation feature to achieve relatively lossless transmission. Therefore, one key element of the invention is to create a synergy between the bit rate conversion of compressed video bit stream and the use of RADSL to transport compressed video bit stream, especially the transform coding based (such as MPEG) compressed video bit stream. Throughout the present application, the term bit rate conversion has been used so as not to preclude the possibility of upward bit rate conversion, but in general practical applications, the need for downward rate conversion far exceeds the need for upward rate conversion. Upward bit rate conversion can be achieved quite easily in different layers above the video compression layer, such as the transport layer (null transport packets), ADSL layer (bearer channel capacity configuration), etc.

As shown in FIG. 9, the third embodiment of the system 900 comprises an integrated bit conversion and transmitter device 902, a physical medium 18, a rate adaptive digital subscriber loop (RADSL) receiver 208 and initialization & reconfiguration logic 908. As shown, the integrated bit conversion and transmitter device 902 further comprises a bit rate conversion device 904 and a rate adaptive digital subscriber loop (RADSL) transmitter 906. The bit rate conversion device 904 has a data input and an output, and is coupled to receive a compressed bit stream at the input on line 210. The output of the bit rate conversion device 904 is coupled to the input of the RADSL transmitter 906 by line 910. The bit rate conversion device 904 also has a control input coupled to receive a control signal from the RADSL transmitter 906 by line 912. Thus, the conversion rate by which the compressed bit stream is reduced or increased is controlled by the signal from the RADSL transmitter 906. For example, the bit rate conversion device 904 may be of the type described above with reference to FIGS. 4 and 5.

Next, the RADSL transmitter 906 processes the bit stream from line 910 and outputs a bit stream over the physical medium 18. The RADSL transmitter 906 is of a conventional type (for example, the RADSL transmitter 906 may be a Copper Gold ADSL chip manufactured by Motorola, Inc. of Schaumburg, Ill.), and as will be described below with reference to FIG. 10; however, it is adapted to provide control signals to the bit rate conversion device 904. In particular, the RADSL transmitter 906 is modified from a conventional type by providing an output for passing along rate control signals received at initialization or during operation. A conventional RADSL transmitter is coupled to receive bit rate change control signals at either initialization or on-line mode. The control signal is in the form of bit rate value that the RADSL transmitter can handle. In one embodiment, this value is passed on to the bit rate conversion device 904 using line 912 to determine the targeted bit rate. Those skilled in the art will realize that the method for passing this rate control signal form the RADSL transmitter 906 to the bit rate conversion device 904 is implementation specific and may be done using any one of a number of conventional techniques.

The bit stream passes over the physical medium 18 to the input of the RADSL receiver 208. The RADSL receiver 208 is of a conventional type, and converts the information to a compress bit stream format which is output on line 214. As shown, the RADSL transmitter 906, the physical medium 18, and the RADSL receiver 208 are each coupled to initialization & reconfiguration logic 908 by line 914 to receive control signals as to how the data is to be coded and decoded before and after transmission over the medium 18. The line 914 is also used to test the medium to determine capacity of the channel or medium 18.

While the initialization & reconfiguration logic 908 is depicted in FIG. 9 as a logic block, those skilled in the art will recognize that the initialization & reconfiguration logic in box 908 may be a suite of signaling protocols exchanged between the RADSL receiver 208 and the RADSL transmitter 906 so that each device knows what is the maximum achievable bit rates in each directions, such as is now conventionally done is RADSL channels, and is an integral part of the ADSL standard.

RADSL adapts the maximum channel capacity to the physical twisted wire 18 line condition by adjusting the coding configuration. In the present invention, the bit rate conversion device 904 is integrated with the RADSL transmitter 906 and is used to adjust the output bit rate down from the input rate R to $R_1$ (typically $R_1 \leq R$). This ensures that when the compressed video bit stream is received at the RADSL receiver 208 (decoder), the resulting bit stream maintains its data integrity and thus yields graceful quality degradation.

In the present invention, the channel capacity supported by the ADSL channel is advantageously conveyed to the rate conversion device 904 during the initialization stage. In addition, on-line adaptation and reconfiguration of the supported rate must also be conveyed to the rate conversion device 904. For example, with the ANSI (DMT) implementation, the maximum channel capacity the link can support at initial connection is signaled from the RADSL receiver 208 to the RADSL transmitter 906 in the R-B&G phase of the initialization process. In ANSI implementation, on-line adaptation and reconfiguration of bit rate are signaled via the ADSL overhead control (aoc) channel and the channel capacity can be increased in minimum steps of 4 kbps at an interval of 17 ms to about 43 sec selectable by the RADSL receiver 208. This provides sufficient flexibility to the rate conversion device to properly setup the rate control parameters to perform the rate conversion.

Figure 10:
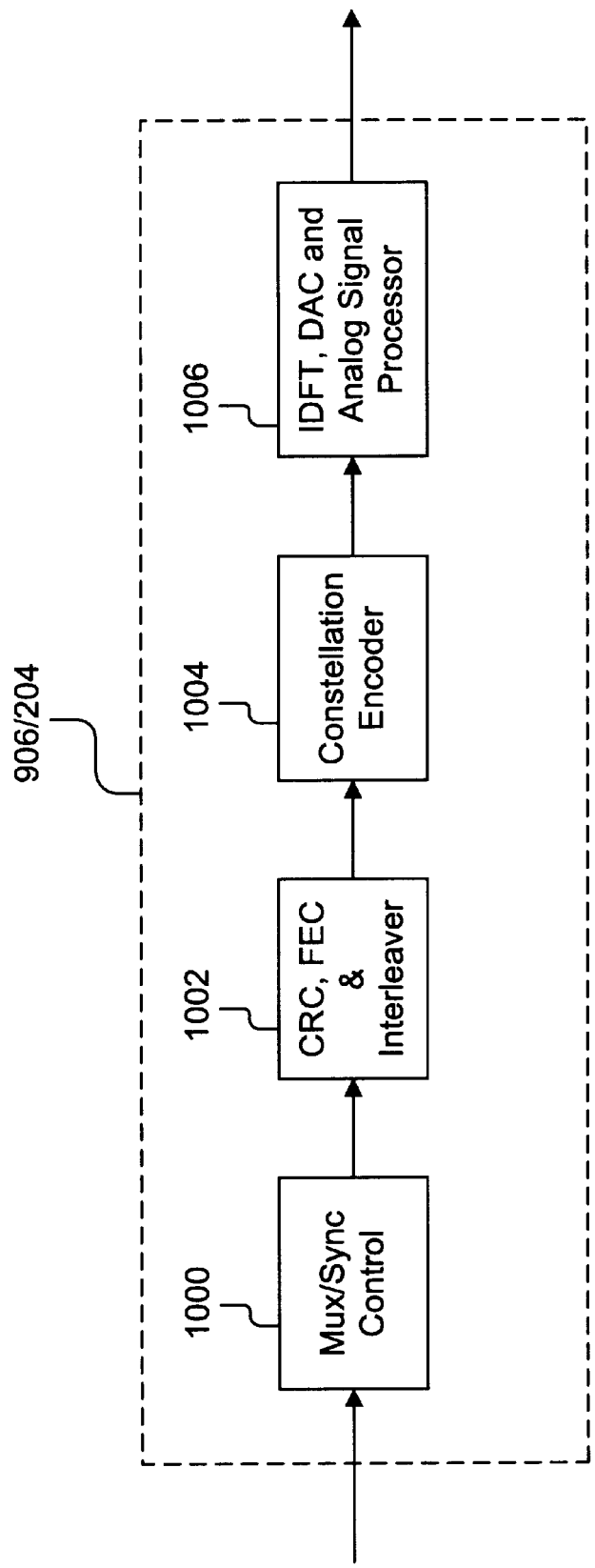
FIG. 10 is a graphical representation of the reference model used for the ADSL transceiver unit-Central Office and the ADSL transceiver unit-Remote terminal.

Referring now to FIG. 10, a graphical representation of the reference model used for the RADSL transmitter 906 and an RADSL receiver 208 is shown. ADSL is becoming widely deployed by major telephone companies and one particular implementation of ADSL, the Discrete Multi-Tone (DMT), has been standardized by the American National Standards Institute (ANSI). In this standard, provisions are made to allow transmitter and receiver to perform initialization, training, optimum bit rate configuration, bit rate changes, etc. ADSL standard based on DMT is modeled as ADSL Transceiver Unit-Central office (ATU-C) and ADSL Transceiver Unit-Remote terminal (ATU-R). This model is shown in more detail in FIG. 10. From the model of FIG. 10, those skilled in the are will recognize that the RADSL receiver 208 has the same component blocks to perform the inverse function in ordered in reverse. The RADSL transmitter 906 preferably comprises a multiplexing and synchronization controller 1000, a error correction and interleaver 1002, a constellation encoder 1004 and a DAC and analog signal processor 1006. The bit stream is received by the multiplexing and synchronization controller 1000 which adds or removes control and synchronization information from the bit stream. The multiplexing and synchronization controller 1000 is coupled to the error correction and interleaver 1002 which performs error correction such as a cyclic redundancy checking and forward error correction. The output of the error correction and interleaver 1002 is in turn coupled to the constellation encoder 1004 which performs encoding on the bit stream. Finally, the bit stream in converted to an analog signal, processed and applied to the physical medium 18 by the DAC and analog signal processor 1006.

Yet another application of the present invention is to Asynchronous Transfer Mode (ATM) networks. The present invention also includes the concept of traffic shaping, used on ATM networks to change the bit rate profile of ATM cell streams through the bit rate conversion of compressed video and has tremendous value in all future ATM network implementations. Traffic shaping within the ATM networks using compressed video bit rate conversion is a crucial enabler of flexibly transport MPEG-2 video, as well as any other types of compressed video streams, over ATM networks. The present invention creates a synergy between the bit rate conversion of compressed video bit stream and the use of ATM networks to transport compressed video bit stream, especially the transform coding based (such as MPEG) compressed video bit stream.

Figure 11:
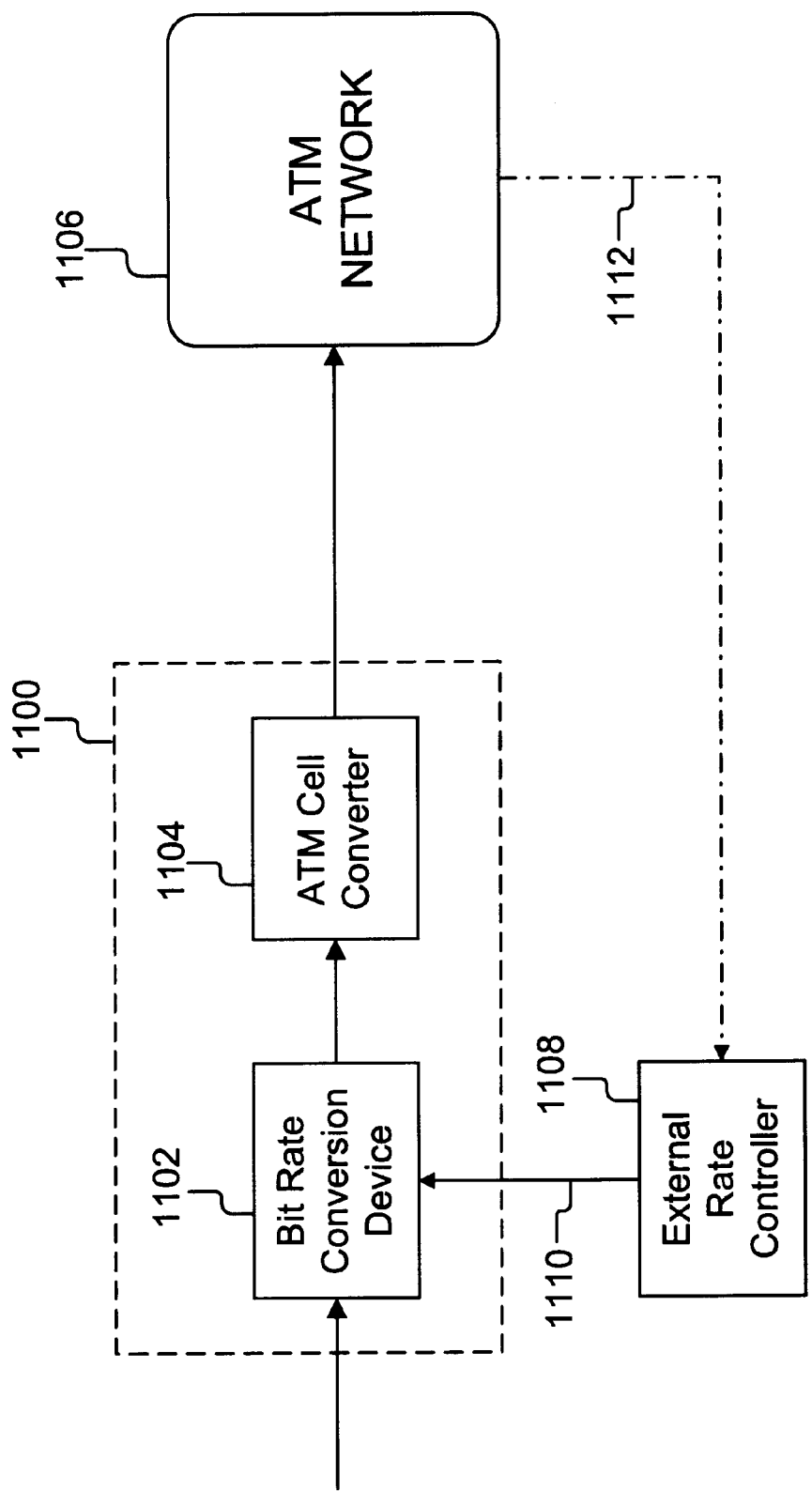
FIG. 11 is a block diagram of a system using the rate conversion device of the present invention as an input point for an asynchronous transfer mode (ATM) network.

Referring now to FIG. 11, another embodiment of the present invention as applied to an asynchronous transfer mode (ATM) network is shown. FIG. 11 is a block diagram of a system using the rate conversion device of the present invention as an input point for an asynchronous transfer mode (ATM) network 1106. In this embodiment, the present invention includes an integrated bit rate conversion device and ATM cell converter 1100 which in turn is coupled to an ATM network 1106. The ATM network 1106 is a conventional type known to those skilled in the art. The integrated bit rate conversion device and ATM cell converter 1100 further comprises a bit rate conversion device 1102 and an ATM cell converter 1104. The bit rate conversion device 1102 is similar to those that have been described above with reference to FIGS. 4 and 5. However, as shown in FIG. 11, the conversion rate is controlled by an external rate controller 1108 that is coupled to the bit rate conversion device 1102 by line 1110. In one embodiment, the external rate controller 1108 is logic or software that generates a control signal to specify a conversion rate that bit rate conversion device 1102 implements. The external rate controller 1108 can provide external commands for setting a target bit rate out of the bit rate conversion device 1102. The target bit rate out of the bit rate conversion device 1102 may be set based on several factors such as congestion condition within the ATM network 1106, connection level bandwidth negotiation between user and the network provider, etc. In yet another embodiment, the external rate controller 1108 receives control signals from the ATM network 1106 such as depicted in FIG. 11 by line 1112, for example from a remote network node. Such a remote node (not shown) can use the underlying conventional ATM signal protocol to provide rate control signals to the external rate controller 1108, as will be understood to those skilled in the art.

In this scenario, compressed video bit stream, such as MPEG-2 transport stream containing video programs, is being transported through the ATM networks from one location to another. In this case, rate conversion scheme is used with the ATM networks to accommodate the bit rate differences between available connection capacity from the ATM networks and the bit rate of the incoming MPEG-2 transport stream when the connection to be established is constant bit rate (CBR). This scheme is implemented at the ingress point of the ATM networks. Once the bit rate conversion device 1102 has converted the compressed video bit stream to a rate suitable for the ATM network 1106, the converted bit stream is provided to the ATM cell converter 1104. The ATM cell converter 1104 packetizes the converted bit stream into fixed sized data units or cells in a conventional manner. The ATM cell converter 1104 preferably performs the conversion from MPEG2 transport packets into ATM cells. In ATM terms, this function is called segmentation and reassembly (SAR), and is part of the ATM adaptation layer protocols (AAL). A typical implementation of the AAL function is in the form of an ASIC chip. The output cells are provided by the ATM cell converter 1104 to the ATM network 1106 and send to their destination.

Figure 12:
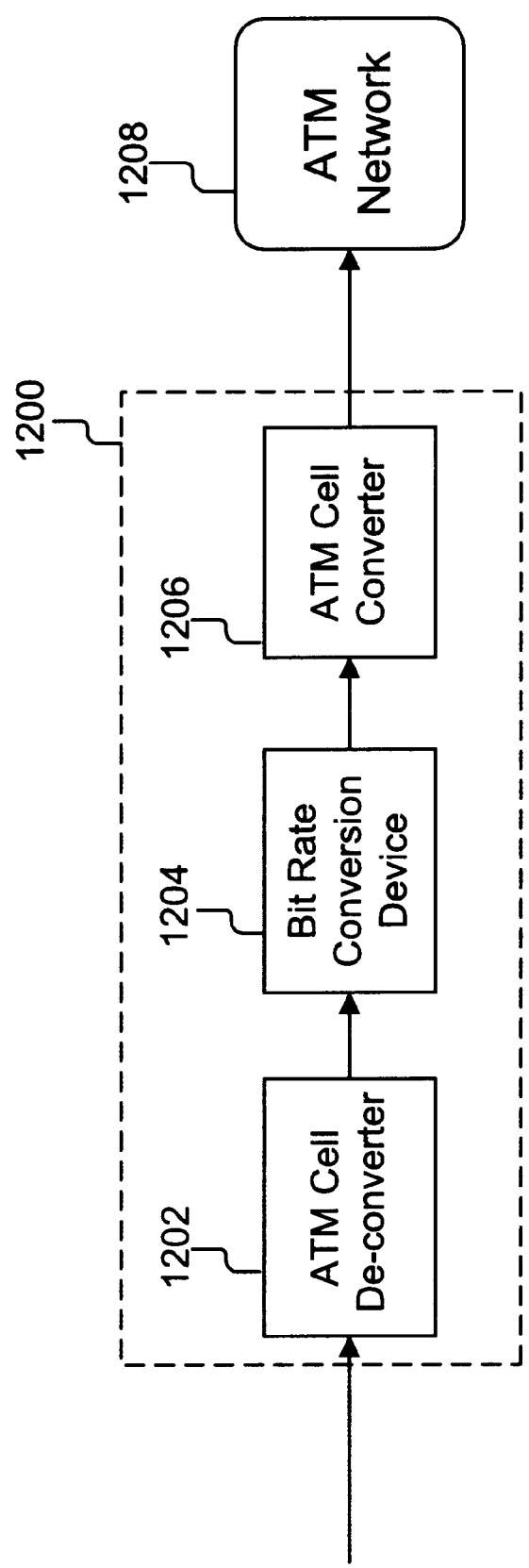
FIG. 12 is a block diagram of a system integrating the rate conversion device of the present invention into an asynchronous transfer mode (ATM) switch.

FIG. 12 is a block diagram of a system integrating the rate conversion device of the present invention into an asynchronous transfer mode (ATM) switch. As shown in FIG. 12, the preferred embodiment of for the integrated ATM converter and bit rate conversion unit 1200 comprises an ATM cell de-converter 1202, a bit rate conversion device 1204, and an ATM cell converter 1206. In this embodiment, the integrated ATM converter and bit rate conversion unit 1200 is used to smooth the bit rate profile of the virtual connection at the ingress to the ATM network so that the resulting bit rate profile of the connection can be admitted by the ATM network. The integrated ATM converter and bit rate conversion unit 1200 can also be used to smooth the bit rate profile within the ATM network at point of traffic congestion so that buffers within the network will not drop cells at times of network congestion. This scheme is implemented within the ATM network, normally co-located with the ATM cross connection (ATM switches) devices where congestion condition requires re-allocation of bandwidth.

The ATM cell de-converter 1202 has an input and an output, and receives ATM cells for further distribution over the ATM network 1208. The ATM cell de-converter 1202 removes the data from its packetized format and restores it to a bit stream of compressed data, which is provided at the output of the ATM cell de-converter 1202. The output of the ATM cell de-converter 1202 is coupled to the input of the bit rate conversion device 1204. The ATM cell de-converter 1202 can be any one of a number of conventional type devices know in the art. The bit rate conversion device 1204 is as has been described above in FIGS. 4 and 5. The bit rate conversion device 1204 changes the bit rate and provide the converted bit stream to the ATM cell converter 1206. The ATM cell converter 1206 takes the converted bit stream and then packetizes the converted bit stream into fixed sized data units or cells in a conventional manner. The output cells are provided by the ATM cell converter 1206 to the ATM network 1208.

Figure 13:
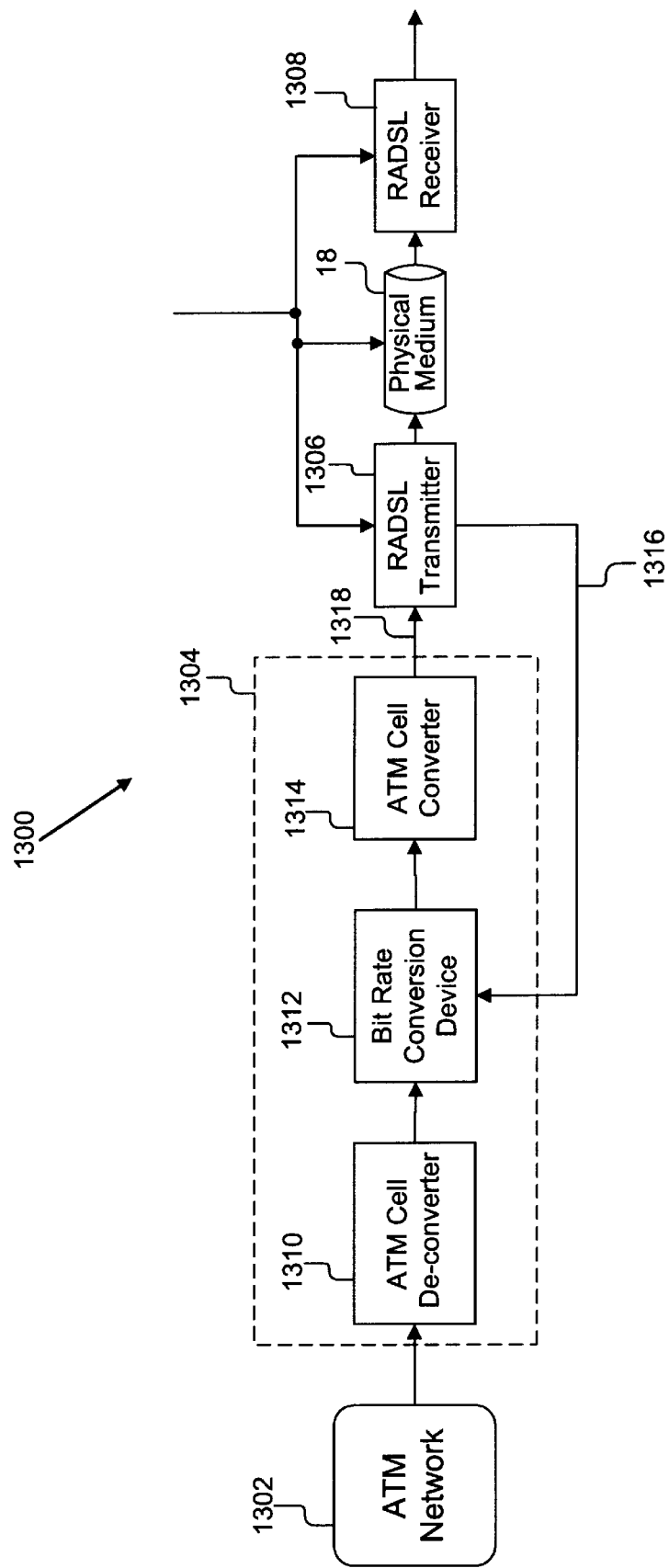
FIG. 13 is a block diagram of a system integrating the rate conversion device of the present invention into an ATM/ADSL communication device.

Finally, referring now to FIG. 13, a block diagram of a system 1300 integrating the rate conversion device of the present invention into an ATM/ADSL communication device is shown. In this embodiment, the rate conversion scheme is used when compressed bit stream is carried as payload of the ATM cell stream, which in turn is transmitted over the RADSL device from the CO to the remote site. In this case, rate conversion is required not because of lack of connection bandwidth within the ATM networks or because of congestion conditions within the ATM networks. The rate conversion is required because the available bandwidth on the RADSL may be smaller than the bit rate of the compressed bit stream. In this case, the RADSL receiver must also perform the segmentation and re-assembly (SAR) of ATM cells before sending the video bit stream to the digital decoder.

As shown in FIG. 13, the system 1300 preferably comprises an ATM network 1302, an integrated ATM converter and bit rate conversion unit 1304, a RADSL transmitter 1306, a physical medium 18 and a RADSL receiver 1308. The ATM network is a conventional type known in the art, and provides ATM cells to the input of the integrated ATM converter & bit rate conversion unit 1304. The integrated ATM converter & bit rate conversion unit 1304 is similar to the type described above with reference to FIG. 12, and comprises an ATM cell de-converter 1310, a bit rate conversion device 1312, and an ATM cell converter 1314. The ATM cell converter 1314 is different than the one described above in FIG. 12 because it receives a control input from the RADSL transmitter via line 1316, in addition to providing the data stream to the RADSL transmitter via line 1318. In particular, as shown in FIG. 13, the signal line 1316 is preferably coupled between the bit rate conversion device 1312 and the RADSL transmitter 1306. The signal line is used to pass the rate control signals to the bit rate conversion device 1312 in a manner similar that described above with reference to FIG. 9. The RADSL transmitter 1306, physical medium 18 and RADSL receiver 1308 are similar to that described above with reference to FIG. 9. The notable differences are that the RADSL transmitter 1306 provides feedback information, and the RADSL receiver 1308 performs the segmentation and re-assembly (SAR) of ATM cells as has been noted above. Those skilled in the art will recognize that FIG. 13 describe the transmission of data only in one direction from 1302 to 1308, and that the RADSL transmitter 1306 and RADSL receiver 1308 are actually transceivers for transmission of data and video in the opposite direction similar to conventional RADSL channel. For such a reverse direction from 1308 to 1302, FIG. 13 could also include a second integrated ATM converter & bit rate conversion unit 1304 (not shown).

While the present invention has been described with reference to certain preferred embodiments, those skilled in the art will recognize that various modifications may be provided. For example, the present invention may be used to perform bandwidth sharing, despite the fact that the available bandwidth from the transmission facility, which includes but is not limited to, xDSL, ATM, wireless channel, is sufficient to send the incoming compressed bit stream. In general, for data traffic, such as TCP/IP based traffic, the data bit rate cannot be determined. In addition, the video bit stream may not have constant bit rate, therefore, the resulting total bandwidth cannot be determined before the connection is established. The application of bit rate conversion, however, will ensure that the resulting total bandwidth will always be less than the total available channel bandwidth. To this end, some kind of priority scheme must also be used to ensure that no video data is lost. Specifically, when the total input bit rate exceeds the channel capacity, TCP/IP based data packets must be discarded by the transmission facility to ensure packets containing video data is not lost. Therefore, there is a trade-off between how much bit rate reduction should be performed to the video bit stream, which results in graceful degradation of video quality, and how much throughput should be made available to TCP/IP based data streams. These and other variations upon and modifications to the preferred embodiments are provided for by the present invention.

What is claimed is:

1. An apparatus for modifying a bit rate of a bit stream to use an available bandwidth of a channel, the apparatus comprising:

a bit rate converter having an input, a control input and an output, the input coupled to receive a first bit stream with a first bit rate, the bit rate converter for converting the first bit stream to a second bit stream having a second bit rate, different from the first bit rate, the second bit stream being provided at the output of the bit rate converter; and a transmitter having an input, a control output, and an output for transmitting data over the channel, the input of the transmitter coupled to the output of the bit rate converter to receive the second bit stream, the output of the transmitter coupled to the channel, the control output of the transmitter being coupled to the control input of the bit rate converter to send a control signal indicating a value for the second bit rate, the transmitter sending the second bit stream over the channel.

2. The apparatus of claim 1, wherein the second bit rate is less than the available channel bandwidth.

3. The apparatus of claim 1, wherein the transmitter is an xDSL transmitter that allows reliable transmission of the second bit stream and wherein the channel is a twisted copper wire.

4. The apparatus of claim 3, wherein the xDSL line condition determines the second bit rate.

5. The apparatus of claim 3, wherein the channel includes a physical medium and an xDSL receiver, the physical medium coupling the xDSL transmitter to the xDSL receiver.

6. The apparatus of claim 5, wherein the xDSL is a rate adaptive digital subscriber loop (RADSL) and the apparatus further comprises initialization logic coupled to the xDSL transmitter, the physical medium and the xDSL receiver for determining the available bandwidth of the channel and for providing a rate control signal to the xDSL transmitter indicating the available bandwidth of the channel, and wherein the xDSL transmitter provides the rate control signal to the bit rate converter.

7. The apparatus of claim 1, wherein the transmitter is an RADSL transmitter that includes a multiplexer and synchronization control, an interleaver, a constellation encoder, and a DAC and analog signal processor coupled in series.

8. The apparatus of claim 1, wherein the transmitter includes an ATM cell converter, the channel is an ATM network, and the second bit rate is about equal to an available connection capacity from the ATM network.

9. The apparatus of claim 8, wherein the apparatus further comprises an external rate controller having an output for providing a rate control signal specifying a desired bit rate, the output of the external rate controller coupled to the control input of the bit rate controller.

10. The apparatus of claim 8, wherein the external rate controller has an input coupled to the ATM network to to receive a signal indicating a connection capacity of the ATM network.

11. The apparatus of claim 8 further comprising an ATM cell de-converter having an input and an output, the input of the ATM cell de-converter coupled to receive ATM cells, the output of the ATM cell de-converter coupled to the input of the bit rate converter, the ATM cell de-converter for converting ATM cells to a compressed bit stream.

12. The apparatus of claim 8 wherein the ATM cell converter includes an ATM segmentation and re-assembly device.

13. The apparatus of claim 8 further comprising:
an RADSL receiver having an input and an output, the input of the RADSL receiver coupled to a physical medium included in the channel.

14. The apparatus of claim 1 wherein the bit rate converter further comprises:
a decoder and extractor having an input and an output for decoding data streams and extracting timing and programming information;
a modification unit having an input and an output for changing the number of bits in the bit stream, the input of the modification unit coupled to the output of the decoder and extractor; and
an encoder having an input and an output for performing coding on a bit stream, the input of the encoder coupled to the output of the modification unit.

15. The apparatus of claim 14 wherein the decoder and extractor further comprises:
a demultiplexer having an input and an output for extracting a video elementary stream; and
an elementary stream bit parser having an input and an output, the input of the elementary stream bit parser coupled to the demultiplexer, the elementary stream bit parser for dividing the video elementary stream into components, the output of the elementary stream bit parser coupled to the modification unit.

16. The apparatus of claim 14 wherein the modification unit further comprises:
a first modification unit for reducing the number of bits needed for discrete cosine transform coefficients;
a second modification unit for reducing the number of bits needed for motion vectors; and
a third modification unit for reducing the number of bits needed for auxiliary information.

17. The apparatus of claim 14 wherein the encoder performs variable length encoding on the bit stream received.

18. The apparatus of claim 14 wherein the bit rate converter further comprises:
a separation unit having an input and a plurality of outputs for dividing the bit stream into a plurality of sub-bit streams, at least one of the plurality of outputs of the separation unit coupled to the input of the decoder and extractor for processing by the decoder and extractor; and
a combining unit having a plurality of inputs and an output for combining a plurality of sub-bit streams into a single bit stream, at least one input of the combining unit coupled to the output of the encoder.

19. An apparatus for bandwidth sharing between a first stream and a second stream, the apparatus comprising
a first bit rate converter having an input and an output, the input of the first bit rate converter coupled to receive the first stream, the first bit rate converter for changing a bit rate of the first stream to a first bit rate;
a second bit rate converter having an input and an output, the input of the second bit rate converter coupled to receive the second stream, the second bit rate converter for changing a bit rate of the second stream to a second bit rate; and
a multiplexer having a first input, a second input and an output, the first input of the multiplexer coupled to output of the first bit rate converter, the second input of the multiplexer coupled to output of the second bit rate converter, the multiplexer determining an intended bit rate profile for the first stream and allocating bandwidth to the first stream, and allocating any remaining bandwidth to the second stream.

20. The apparatus of claim 19 further comprising:
a transmitter having an input and an output for transmitting data over the channel, the transmitter having its input coupled to the output of the multiplexer to receive a mixed bit stream, the transmitter sending the mixed bit stream over the channel such that bit errors occur at a rate no more than a predetermined value.

21. The apparatus of claim 19, wherein the first stream is a compressed video bit stream and the second stream is a TCP/IP based data stream.

22. A method for modifying a bit rate of a bit stream to use an available bandwidth of a channel, the method comprising the steps of:
determining the bandwidth of the channel;
receiving the bit stream;
converting the bit stream to have a bit rate less than or equal to the bandwidth of the channel wherein converting the bit stream includes modifying data in the bit stream; and
transmitting the converted bit stream over the channel.

23. The method of claim 22 wherein the step of transmitting includes the step of sending the converted bit stream over a rate adaptive digital subscriber loop.

24. The method of claim 22 wherein the step of converting is controlled by a rate control signal from a RADSL transmitter.

25. The method of claim 22 wherein the step of determining the bandwidth of the channel is performed by initialization logic signaling an RADSL transmitter, a physical medium and a RADSL receiver.

26. The method of claim 22 wherein the step of transmitting the converted bit stream over the channel comprises ATM segmentation and re-assembly.

27. The method of claim 22 wherein the step of converting is controlled by a rate control signal from an ATM network.

28. The method of claim 22 further comprising the step of converting ATM cells to the bit stream before the bit stream is received.

29. The method of claim 22 wherein the step of transmitting the converted bit stream over the channel comprises the steps of:

converting the bit stream to ATM cells; and sending the converted bit stream over a rate adaptive digital subscriber loop.

30. The method of claim 22 wherein the step of converting the bit stream to have a bit rate less than or equal to the bandwidth of the channel comprises the steps of:

decoding data streams and extracting timing and programming information;

modifying the number of bits in the bit stream; and encoding the bit stream.

31. The method of claim 30 wherein the step of decoding data streams and extracting timing further comprises the steps of:

demultiplexing to extract a video elementary stream; and parsing the video elementary stream to divide the video elementary stream into components.

32. The method of claim 30 wherein the step of modifying the number of bits in the bit stream further comprises the steps of:

reducing the number of bits needed for discrete cosine transform coefficients;

adjusting the number of bits needed for motion vectors; and reducing the number of bits needed for auxiliary information.

33. The method of claim 30 wherein the step of encoding performs variable length encoding on the bit stream received.

34. The method of claim 30 further comprising the steps of:

separating a bit stream into a plurality of sub-bit streams for the steps of decoding, modifying and encoding; and combining the plurality of sub-bit streams after decoding, modifying and encoding.

35. A method for bandwidth sharing between a first stream and a second stream, the method comprising the steps of:

bit rate converting the first stream to produce a converted first stream;

bit rate converting the second stream to produce a converted second stream; and multiplexing between the converted first stream and the converted second stream based on an intended bit rate profile for the first stream and allocating bandwidth to the converted first stream, and allocating any remaining bandwidth to the converted second stream.

36. The method of claim 35 further comprising the step of transmitting the multiplexed data stream over a channel such that bit errors occur at a rate no more than a predetermined value.

37. The method of claim 35, wherein the first stream is a compressed video bit stream and the second stream is a TCP/IP based data stream.

\* \* \* \* \*